United States Patent
Bugg et al.

(10) Patent No.: US 9,068,776 B2
(45) Date of Patent: Jun. 30, 2015

(54) DEPOSITING AND FARMING METHODS FOR DRYING OIL SAND MATURE FINE TAILINGS

(75) Inventors: Trevor Bugg, Fort McMurray (CA); Jamie Eastwood, Fort McMurray (CA); Adrian Peter Revington, Fort McMurray (CA); Marvin Harvey Weiss, Calgary (CA); Patrick Sean Wells, Fort McMurray (CA); Thomas Charles Hann, Onoway (CA); Stephen Joseph Young, Fort McMurray (CA); Hugues Robert O'Neill, Fort McMurray (CA)

(73) Assignee: SUNCOR ENERGY INC., Calgary (CA)

( * ) Notice: Subject to any disclaimer, the term of this patent is extended or adjusted under 35 U.S.C. 154(b) by 420 days.

(21) Appl. No.: 13/505,228

(22) PCT Filed: Oct. 30, 2009

(86) PCT No.: PCT/CA2009/001578
§ 371 (c)(1),
(2), (4) Date: Dec. 6, 2012

(87) PCT Pub. No.: WO2011/050440
PCT Pub. Date: May 5, 2011

(65) Prior Publication Data
US 2013/0081298 A1    Apr. 4, 2013

(51) Int. Cl.
*F26B 11/02*    (2006.01)
*F26B 7/00*    (2006.01)
(Continued)

(52) U.S. Cl.
CPC ... *F26B 7/00* (2013.01); *F26B 5/00* (2013.01); *F26B 2200/14* (2013.01); *B09C 1/08* (2013.01)

(58) Field of Classification Search
CPC .............. F26B 5/00; F26B 9/00; F26B 11/00; F26B 1/02
USPC ................... 34/372, 380, 381, 401, 413, 497; 210/97, 512, 732, 800
See application file for complete search history.

(56) References Cited

U.S. PATENT DOCUMENTS 2,544,616 A * 3/1951 Sartorius ......................... 34/372
2,786,651 A   3/1957 Mickle
(Continued)

FOREIGN PATENT DOCUMENTS

CA    1064016 A1    10/1979
CA    1070864 A1    1/1980
(Continued)

OTHER PUBLICATIONS

Sworska, A., et al., "Flocculation of the Syncrude fine tailings. Part I. Effect of pH, polymer dosage and Mg2+ anmd Ca2+ cations", Int. J. Miner. Process 60 (2000) 143-52 [Document 892].
(Continued)

*Primary Examiner* — Steve M Gravini
(74) *Attorney, Agent, or Firm* — Baker & Hostetler LLP

(57) ABSTRACT

Methods for drying oil sand fine tailings treated to comprise flocculated fine tailings, by deposition and farming techniques, are provided. A deposition cell is provided with a sloped bottom surface and the flocculated fine tailings are deposited to undergo channelless advancement in the cell while allowing drainage of release water. When the deposit is uneven, the deposit may be plowed while wet for spreading and ensuring water release conditioning is imparted thereto, while avoiding over-shearing, and maintaining sufficient shear strength to allow standing. Once a dried upper crust forms, the deposit may be harrowed to break up the crust, expose wet regions there-beneath and create furrows in the standing deposit. The methods improve the dewatering and drying of mature fine tailings in oil sands.

12 Claims, 17 Drawing Sheets

(51) Int. Cl.
    *F26B 5/00*     (2006.01)
    *B09C 1/08*     (2006.01)

(56) References Cited

U.S. PATENT DOCUMENTS

| | | | |
|---|---|---|---|
| 3,259,570 A | 7/1966 | Priesing et al. | |
| 3,319,579 A | 5/1967 | Stack | |
| 3,629,951 A * | 12/1971 | Davis et al. | 34/498 |
| 3,642,619 A | 2/1972 | Lo Sasso et al. | |
| 3,763,263 A | 10/1973 | Sze et al. | |
| 3,968,572 A * | 7/1976 | Stuchberry | 34/134 |
| 4,033,853 A * | 7/1977 | Hann | 208/39 |
| 4,222,857 A * | 9/1980 | McCarthy | 209/9 |
| 4,242,098 A | 12/1980 | Braun et al. | |
| 4,290,890 A | 9/1981 | Bauer | |
| 4,399,039 A * | 8/1983 | Yong | 210/728 |
| 4,437,998 A * | 3/1984 | Yong | 210/728 |
| 4,487,553 A | 12/1984 | Nagata | |
| 4,702,844 A | 10/1987 | Flesher et al. | |
| 4,767,540 A | 8/1988 | Spitzer et al. | |
| 5,093,009 A | 3/1992 | Candau et al. | |
| 5,183,335 A | 2/1993 | Lang et al. | |
| 5,316,664 A * | 5/1994 | Gregoli et al. | 208/390 |
| 5,340,467 A * | 8/1994 | Gregoli et al. | 208/390 |
| 5,355,594 A * | 10/1994 | Hwang | 34/356 |
| 5,393,381 A | 2/1995 | Hund et al. | |
| 5,733,462 A | 3/1998 | Mallon et al. | |
| 5,750,614 A | 5/1998 | Hund et al. | |
| 5,843,320 A | 12/1998 | Huang et al. | |
| 5,925,714 A | 7/1999 | Larson et al. | |
| 5,951,955 A | 9/1999 | Flieg et al. | |
| 5,985,992 A | 11/1999 | Chen | |
| 6,077,441 A | 6/2000 | Luke | |
| 6,090,293 A | 7/2000 | Cardini et al. | |
| 6,944,967 B1 * | 9/2005 | Staples | 34/183 |
| 7,340,845 B2 * | 3/2008 | Kneebone | 34/60 |
| 7,504,445 B2 | 3/2009 | Collin | |
| 7,700,702 B2 | 4/2010 | Gaillard et al. | |
| 8,242,215 B2 | 8/2012 | Hund et al. | |
| 8,480,907 B2 | 7/2013 | Vion et al. | |
| 2007/0289911 A1 | 12/2007 | Cymerman et al. | |
| 2008/0099380 A1 | 5/2008 | Lahaie et al. | |
| 2009/0020458 A1* | 1/2009 | Bozak et al. | 208/390 |
| 2009/0116908 A1 | 5/2009 | Dymond et al. | |
| 2009/0189113 A1 | 7/2009 | Lamperd et al. | |
| 2012/0031303 A1* | 2/2012 | Constantz et al. | 106/640 |
| 2012/0175315 A1* | 7/2012 | Revington et al. | 210/732 |
| 2013/0075340 A1* | 3/2013 | Bara et al. | 210/710 |
| 2013/0081298 A1* | 4/2013 | Bugg et al. | 34/389 |
| 2014/0054231 A1* | 2/2014 | Spence et al. | 210/710 |
| 2014/0116925 A1* | 5/2014 | Bara et al. | 208/390 |
| 2014/0151269 A1* | 6/2014 | Van Der Merwe et al. | 208/390 |
| 2014/0166586 A1* | 6/2014 | Sikes | 210/708 |
| 2014/0251183 A1* | 9/2014 | Moffett | 106/287.17 |

FOREIGN PATENT DOCUMENTS

| | | |
|---|---|---|
| CA | 1071339 | 2/1980 |
| CA | 1071339 A1 | 2/1980 |
| CA | 1076275 A1 | 4/1980 |
| CA | 1085762 A1 | 9/1980 |
| CA | 1087133 A1 | 10/1980 |
| CA | 1091604 A1 | 12/1980 |
| CA | 1109408 A1 | 9/1981 |
| CA | 1110950 A1 | 10/1981 |
| CA | 1119985 A1 | 3/1982 |
| CA | 1122730 A1 | 4/1982 |
| CA | 1123309 A1 | 5/1982 |
| CA | 1123977 A1 | 5/1982 |
| CA | 1140281 A1 | 1/1983 |
| CA | 1162869 A1 | 2/1984 |
| CA | 1165712 A1 | 4/1984 |
| CA | 1180827 A1 | 1/1985 |
| CA | 1182418 A1 | 2/1985 |
| CA | 1188435 A1 | 6/1985 |
| CA | 2004549 A1 | 6/1990 |
| CA | 2005681 A1 | 6/1990 |
| CA | 2006795 | 6/1990 |
| CA | 1273888 A1 | 9/1990 |
| CA | 2012097 A1 | 9/1990 |
| CA | 1277449 C | 12/1990 |
| CA | 2006483 A1 | 6/1991 |
| CA | 2077453 A1 | 10/1991 |
| CA | 2042162 A1 | 12/1991 |
| CA | 2075946 A1 | 12/1991 |
| CA | 2076011 A1 | 12/1991 |
| CA | 2052742 A1 | 4/1992 |
| CA | 1301692 C | 5/1992 |
| CA | 2060042 A1 | 8/1992 |
| CA | 2114436 A1 | 2/1993 |
| CA | 2059828 A1 | 3/1993 |
| CA | 2115153 A1 | 3/1993 |
| CA | 2120005 A1 | 4/1993 |
| CA | 2084129 A1 | 6/1993 |
| CA | 2088320 A1 | 7/1993 |
| CA | 2128339 A1 | 8/1993 |
| CA | 2097127 | 12/1993 |
| CA | 2137134 A1 | 12/1993 |
| CA | 2137139 A1 | 12/1993 |
| CA | 2099472 A1 | 1/1994 |
| CA | 2105333 A1 | 3/1994 |
| CA | 2127427 A1 | 1/1995 |
| CA | 1334562 C | 2/1995 |
| CA | 2143016 A1 | 8/1995 |
| CA | 2159328 A1 | 8/1995 |
| CA | 2159329 A1 | 8/1995 |
| CA | 2145939 A1 | 10/1995 |
| CA | 2123076 A1 | 11/1995 |
| CA | 2192388 A1 | 12/1995 |
| CA | 2130587 A1 | 2/1996 |
| CA | 2195448 A1 | 2/1996 |
| CA | 2204365 A1 | 5/1996 |
| CA | 2165385 A1 | 6/1996 |
| CA | 2169875 A1 | 8/1996 |
| CA | 2183380 A1 | 8/1996 |
| CA | 2172122 A1 | 9/1996 |
| CA | 2189850 A1 | 9/1996 |
| CA | 2216847 A1 | 10/1996 |
| CA | 2217294 A1 | 10/1996 |
| CA | 2223855 A1 | 2/1997 |
| CA | 2182251 A1 | 5/1997 |
| CA | 2206143 A1 | 5/1997 |
| CA | 2235006 A1 | 5/1997 |
| CA | 1339285 C | 8/1997 |
| CA | 2247184 A1 | 9/1997 |
| CA | 2258751 A1 | 12/1997 |
| CA | 2210865 A1 | 1/1998 |
| CA | 2249367 A1 | 1/1998 |
| CA | 2260070 A1 | 1/1998 |
| CA | 2264803 A1 | 4/1998 |
| CA | 2268075 A1 | 4/1998 |
| CA | 1339850 C | 5/1998 |
| CA | 2276698 A1 | 7/1998 |
| CA | 2277098 A1 | 7/1998 |
| CA | 2287996 A1 | 11/1998 |
| CA | 2291669 A1 | 12/1998 |
| CA | 2243608 | 2/1999 |
| CA | 2248479 A1 | 3/1999 |
| CA | 2306797 A1 | 5/1999 |
| CA | 2313544 A1 | 6/1999 |
| CA | 2317636 A1 | 7/1999 |
| CA | 2319419 A1 | 8/1999 |
| CA | 2326355 A1 | 10/1999 |
| CA | 2333508 A1 | 12/1999 |
| CA | 2334196 A1 | 12/1999 |
| CA | 2334744 A1 | 12/1999 |
| CA | 2346249 A1 | 4/2000 |
| CA | 2362134 A1 | 9/2000 |
| CA | 2365347 A1 | 10/2000 |
| CA | 2368604 A1 | 10/2000 |
| CA | 2378718 A1 | 1/2001 |
| CA | 2378131 A1 | 3/2001 |
| CA | 2407869 A1 | 12/2001 |
| CA | 2418483 A1 | 2/2002 |

(56) References Cited

FOREIGN PATENT DOCUMENTS

| | | |
|---|---|---|
| CA | 2364854 A1 | 6/2002 |
| CA | 2429476 A1 | 6/2002 |
| CA | 2370922 A1 | 8/2002 |
| CA | 2392246 A1 | 1/2003 |
| CA | 2465649 A1 | 6/2003 |
| CA | 2441969 A1 | 5/2004 |
| CA | 2504890 A1 | 5/2004 |
| CA | 2515581 A1 | 7/2004 |
| CA | 2532792 A1 | 3/2005 |
| CA | 2532953 A1 | 3/2005 |
| CA | 2535702 A1 | 3/2005 |
| CA | 2483501 A1 | 5/2005 |
| CA | 2546112 A1 | 6/2005 |
| CA | 2557802 A1 | 10/2005 |
| CA | 2558038 A1 | 10/2005 |
| CA | 2558092 A1 | 10/2005 |
| CA | 2558143 A1 | 10/2005 |
| CA | 2562996 A1 | 10/2005 |
| CA | 2591884 A1 | 7/2006 |
| CA | 2592586 A1 | 7/2006 |
| CA | 2592590 A1 | 7/2006 |
| CA | 2594243 A1 | 7/2006 |
| CA | 2594856 A1 | 7/2006 |
| CA | 2596648 A1 | 8/2006 |
| CA | 2512324 A1 | 1/2007 |
| CA | 2628270 A1 | 5/2007 |
| CA | 2636135 A1 | 7/2007 |
| CA | 2641582 A1 | 8/2007 |
| CA | 2645450 A1 | 9/2007 |
| CA | 2651440 A1 | 11/2007 |
| CA | 2651767 A1 | 11/2007 |
| CA | 2651863 A1 | 11/2007 |
| CA | 2567185 A1 | 4/2008 |
| CA | 2665579 A1 | 5/2008 |
| CA | 2672578 A1 | 7/2008 |
| CA | 2582059 A1 | 9/2008 |
| CA | 2667281 A1 | 9/2008 |
| CA | 2677846 A1 | 9/2008 |
| CA | 2684493 A1 | 10/2008 |
| CA | 2594182 A1 | 1/2009 |
| CA | 2634748 A1 | 1/2009 |
| CA | 2606312 A1 | 4/2009 |
| CA | 2653582 A1 | 8/2009 |
| CA | 2674660 A1 | 11/2009 |
| CA | 2665350 A1 | 12/2009 |
| CA | 2701317 A1 | 3/2011 |
| CA | 2684232 A1 | 4/2011 |
| CA | 2735330 A1 * | 4/2011 |
| DE | 3626985 A1 * | 2/1988 ............ C22B 34/20 |
| EP | 184720 A1 * | 6/1986 ............ E21C 41/06 |
| EP | 0733596 A1 | 9/1996 |
| FR | 2172306 | 9/1973 |
| FR | 2577563 A1 | 8/1986 |
| FR | 2582663 A1 | 12/1986 |
| FR | 2588818 A1 | 4/1987 |
| FR | 2589145 A1 | 4/1987 |
| FR | 2637649 A1 | 4/1990 |
| FR | 2666080 A3 | 2/1992 |
| FR | 2678629 A1 | 1/1993 |
| FR | 2700771 A1 | 7/1994 |
| FR | 2718656 A1 | 10/1995 |
| FR | 2729089 A1 | 7/1996 |
| FR | 2779752 A1 | 12/1999 |
| GB | 1175053 A * | 12/1969 |
| GB | 1184003 A | 3/1970 |
| GB | 1507601 A1 | 4/1978 |
| GB | 2270519 A | 3/1994 |
| JP | 2006168234 A * | 6/2006 |
| WO | 9821271 A1 | 5/1998 |
| WO | 0053641 A1 | 9/2000 |
| WO | 0053816 A1 | 9/2000 |
| WO | 0058378 A1 | 10/2000 |
| WO | 0117914 A1 | 3/2001 |
| WO | 0122795 A1 | 4/2001 |
| WO | 0125493 A1 | 4/2001 |
| WO | 0164179 A1 | 9/2001 |
| WO | 0197772 A1 | 12/2001 |
| WO | 0204367 A1 | 1/2002 |
| WO | 0210225 A1 | 2/2002 |
| WO | 0234796 A1 | 5/2002 |
| WO | 0244093 A2 | 6/2002 |
| WO | 02057322 A1 | 7/2002 |
| WO | 02083258 A2 | 10/2002 |
| WO | 03066800 A2 | 8/2003 |
| WO | 2004020395 A1 | 3/2004 |
| WO | 2004060819 A1 | 7/2004 |
| WO | 2004089322 A1 | 10/2004 |
| WO | 2005040240 A2 | 5/2005 |
| WO | 2005053748 A1 | 6/2005 |
| WO | 2005079965 A1 | 9/2005 |
| WO | 2005087712 A1 | 9/2005 |
| WO | 2005100423 A1 | 10/2005 |
| WO | 2006021708 A1 | 3/2006 |
| WO | 2006070147 A2 | 7/2006 |
| WO | 2008107034 A2 | 9/2008 |
| WO | 2009009887 A1 | 1/2009 |
| WO | 2009040166 A1 | 4/2009 |
| WO | 2009044075 A2 | 4/2009 |
| WO | 2009127893 A1 | 10/2009 |
| WO | WO 2011032253 A1 * | 3/2011 |

OTHER PUBLICATIONS

Sworska, A., et al., "Flocculation of the Syncrude fine tailings. Part II. Effect of hydrodynamic condictions", Int. J. Miner. Process 60 (2000) 153-61.

Kasperski, K.L., "A Review of Properties and Treatment of Oil Sands Tailings", AOSTRA Journal of Research (1991), vol. 8, pp. 1-43.

Wells, P.S., et al. "MFT Drying—Case Study in the Use of Rheological Modification and Dewatering Through Thin Lift Deposition in the Oil Sands of Alberta" (2007).

Omotoso, D. et al., "Polymer Dosing of MFT as a Function of Clay Activity" (2009).

Owen et al., "Using turbulent pipe flow to stud the factors affecting polymer-bridging flocculation of mineral systems", International Journal of Mineral Processing, Elsevier, 2008.

Vrale et al., "Rapid Mixing in Water Treatment", Journal American Water Works Association, Jan. 1971, vol. 63, No. 1., pp. 52-58.

Ezeagwula, Kingsley Emeka, Studies on flocculation of kaolin suspensions and mature fine tailings, Department of Chemical and Materials Engineering, University of Alberta, 2008.

Inyo Process, Sludge polymer injection wafer four port, Apr. 3, 2007.

Franks, G. et al., Aggregate size and density after shearing, implications for dewatering fine tailings with hydrocyclones, International Journal of Mineral Processing, vol. 77, p. 46-52, 2005.

* cited by examiner

Fig. 8
Mass Fraction of Flocculent Solution

DEPOSITING AND FARMING METHODS FOR DRYING OIL SAND MATURE FINE TAILINGS

CROSS-REFERENCE TO RELATED APPLICATIONS

This application is a National Stage of International Patent Application No. PCT/CA2009/001578, filed on Oct. 30, 2009, the contents of which are incorporated herein by reference in their entireties.

FIELD OF THE INVENTION

The present invention generally relates to the field of treating oil sand fine tailings.

BACKGROUND

Oil sand fine tailings have become a technical, operational, environmental, economic and public policy issue.

Oil sand tailings are generated from hydrocarbon extraction process operations that separate the valuable hydrocarbons from oil sand ore. All commercial hydrocarbon extraction processes use variations of the Clark Hot Water Process in which water is added to the oil sands to enable the separation of the valuable hydrocarbon fraction from the oil sand minerals. The process water also acts as a carrier fluid for the mineral fraction. Once the hydrocarbon fraction is recovered, the residual water, unrecovered hydrocarbons and minerals are generally referred to as "tailings".

The oil sand industry has adopted a convention with respect to mineral particle sizing. Mineral fractions with a particle diameter greater than 44 microns are referred to as "sand". Mineral fractions with a particle diameter less than 44 microns are referred to as "fines". Mineral fractions with a particle diameter less than 2 microns are generally referred to as "clay", but in some instances "clay" may refer to the actual particle mineralogy. The relationship between sand and fines in tailings reflects the variation in the oil sand ore make-up, the chemistry of the process water and the extraction process.

Conventionally, tailings are transported to a deposition site generally referred to as a "tailings pond" located close to the oil sands mining and extraction facilities to facilitate pipeline transportation, discharging and management of the tailings. Due to the scale of operations, oil sand tailings ponds cover vast tracts of land and must be constructed and managed in accordance with regulations. The management of pond location, filling, level control and reclamation is a complex undertaking given the geographical, technical, regulatory and economic constraints of oil sands operations.

Each tailings pond is contained within a dyke structure generally constructed by placing the sand fraction of the tailings within cells or on beaches. The process water, unrecovered hydrocarbons, together with sand and fine minerals not trapped in the dyke structure flow into the tailings pond. Tailings streams initially discharged into the ponds may have fairly low densities and solids contents, for instance around 0.5-10 wt %.

In the tailings pond, the process water, unrecovered hydrocarbons and minerals settle naturally to form different strata. The upper stratum is primarily water that may be recycled as process water to the extraction process. The lower stratum contains settled residual hydrocarbon and minerals which are predominately fines. This lower stratum is often referred to as "mature fine tailings" (MFT). Mature fine tailings have very slow consolidation rates and represent a major challenge to tailings management in the oil sands industry.

The composition of mature fine tailings is highly variable. Near the top of the stratum the mineral content is about 10 wt % and through time consolidates up to 50 wt % at the bottom of the stratum. Overall, mature fine tailings have an average mineral content of about 30 wt %. While fines are the dominant particle size fraction in the mineral content, the sand content may be 15 wt % of the solids and the clay content may be up to 75 wt % of the solids, reflecting the oil sand ore and extraction process. Additional variation may result from the residual hydrocarbon which may be dispersed in the mineral or may segregate into mat layers of hydrocarbon. The mature fine tailings in a pond not only has a wide variation of compositions distributed from top to bottom of the pond but there may also be pockets of different compositions at random locations throughout the pond.

Mature fine tailings behave as a fluid-like colloidal material. The fact that mature fine tailings behave as a fluid significantly limits options to reclaim tailings ponds. In addition, mature fine tailings do not behave as a Newtonian fluid, which makes continuous commercial scale treatments for dewatering the tailings all the more challenging. Without dewatering or solidifying the mature fine tailings, tailings ponds have increasing economic and environmental implications over time.

There are some methods that have been proposed for disposing of or reclaiming oil sand tailings by attempting to solidify or dewater mature fine tailings. If mature fine tailings can be sufficiently dewatered so as to convert the waste product into a reclaimed firm terrain, then many of the problems associated with this material can be curtailed or completely avoided. As a general guideline target, achieving a solids content of 75 wt % for mature fine tailings is considered sufficiently "dried" for reclamation.

Some known methods have attempted to treat oil sand tailings with the addition of a chemical to create a modified material that can be deposited. The chemically modified oil sand tailings have conventionally been sent subsurface or dumped and stacked onto a deposition area according to the area's availability and proximity to the chemical addition site and left to dry. The variability of the raw oil sand fine tailings and the process operating conditions of chemical addition can lead to variability in the physical properties of the resulting modified tailings material that is deposited. Consequently, known techniques for treating and then depositing fine tailings have had various difficulties and disadvantages.

Management of deposition and drying must deal with significant quantities of fine tailings with variable compositions and properties. For instance, bag filters, track-packing, filter pressing and other techniques are unsuitable for deposition and post-deposition handling of oil sand fine tailings. Known methods for deposition and post-deposition management of treated oil sand tailings have a variety of drawbacks including inefficient use of land and energy, bottlenecks in the process, uncontrolled dewatering, mechanical equipment clogging, difficulties in releasing, draining and recovering water and inefficient use of drying mechanisms.

Given the significant inventory and ongoing production of fine tailings at oil sands operations, there is a need for techniques and advances in fine tailings drying.

SUMMARY OF THE INVENTION

The present invention responds to the above need by providing methods for drying oil sand fine tailings.

Accordingly, the invention provides a method for drying oil sand fine tailings, comprising chemically treating the fine tailings to produce modified fine tailings comprising flocculated fine tailings; providing a deposition cell having a sloped bottom surface; depositing the modified fine tailings into the deposition cell such that the sloped bottom surface allows the flocculated fine tailings to form a deposit that undergoes buildup and channelless advancement over the sloped bottom surface and allows gravity drainage of release water away from the deposit; and allowing the deposit to stand within the deposition cell and for drying.

The sloped bottom surface of the cell advantageously cooperates with the flocculated fine tailings to allow gravity to induce the deposit to gently advance over the deposition cell and the release water to flow away from the advancing deposit, so as to avoid channeling and allow the flocs to retain capture of the fines, to particularly improve the initial dewatering of the deposit which accelerates the overall drying. The sloped bottom surface allows improved drainage of both release water contained in the original fine tailings and precipitation that may occur since the deposition cells are located outdoors.

The invention also provides a method for drying oil sand fine tailings, comprising providing a deposition cell comprising a head region; a toe region spaced away from the head region; and a sloped bottom surface extending from the head region to the toe region such that the toe region is at a lower elevation than the head region; depositing flocculated fine tailings at the head region of the deposition cell, to form a deposit that undergoes buildup and moves down the sloped bottom surface, the deposit forming a built-up area and a lower area; and plowing the deposit while wet to spread the modified fine tailings from the built-up area toward the lower area, to ensure water release conditioning while avoiding over-shearing and maintaining sufficient shear strength of the flocculated fine tailings to allow standing.

The plowing of the deposit advantageously cooperates with the flocculated fine tailings which have increased yield strength yet can have variable properties upon deposition, to ensure sufficient water release conditioning, improve land utilization and accelerate the overall drying.

The invention also provides a method for drying oil sand fine tailings, comprising depositing chemically modified fine tailings comprising flocculated fine tailings into a deposition cell so as to form a standing deposit; allowing the standing deposit to partially dewater and dry to form a dried upper crust; and harrowing the standing deposit to break up the dried upper crust, expose wet regions there-beneath and create furrows in the standing deposit.

The harrowing of the deposit advantageously cooperates with the flocculated fine tailings ones they have formed a dried upper crust, to both enhance evaporative drying mechanisms and create furrows to enhance drainage of release water permeating out of the wet regions of the deposit and of precipitation that may occur since the deposition cells are located outdoors, thereby improving the overall drying of the oil sand fine tailings.

BRIEF DESCRIPTION OF THE DRAWINGS

FIG. 8 is a close-up view of section VIII of FIG. 7.

DETAILED DESCRIPTION OF THE PREFERRED EMBODIMENTS

The methods described herein were developed to overcome a number of challenges with respect to managing material produced during oil sand fine tailings drying operations. For convenience, the overall drying operation will be referred to as the "MFT drying process".

The methods of the present invention are used in conjunction with chemically altering raw oil sand fine tailings to produce modified fine tailings. One technique of producing the modified fine tailings is through flocculation and subsequent pipeline handling and conditioning, which will be described further below in order to contextualise the deposition and farming methodologies of the present invention. For now, briefly put, the oil sand fine tailings are preferably treated with a flocculent solution by in-line dispersion and are then conditioned by inputting sufficient energy to cause the formation and rearrangement of flocculated fine tailing solids to increase the yield shear strength while enabling water release without over-shearing the flocculated solid structure. The modified fine tailings are then ready to be deposited.

According to embodiments of the present invention, material for treatment consists of oil sand fine tailings. "Oil sand fine tailings" means tailings derived from oil sands extraction operations and containing a fines fraction. They include mature fine tailings from tailings ponds and fine tailings from ongoing extraction operations that may bypass a pond, and combinations thereof. In the present description, the abbreviation MFT will be generally used, but it should be understood that the fine tailings treated according the methods of the present invention are not necessarily obtained from a tailings pond.

Both deposition of the modified fine tailings and post-deposition management involve a number of challenges. Improper deposition or post-deposition management can reduce efficiency or even prevent drying of the deposit. It is inadvisable for continuous and large-scale operations to deposit modified tailings unsystematically on various surface areas and simply allow it to stand. A methodology geared to oil sand fine tailings and accounting for release water quality and quantity, drying rates and land use efficiency has thus been developed.

In one embodiment, the method provides a deposition cell allowing effective drainage of release water, controlled stacking and advancing of the flocculated fine tailings within the deposition cell while avoiding "channelling". Deposited material that has insufficient shear strength for a given cell design will entrain flocculated tailings in the release water resulting in channelling of flow. Channelling has several negative impacts on the deposition and overall drying process. More regarding channelling will be discussed further below.

Figure 1:
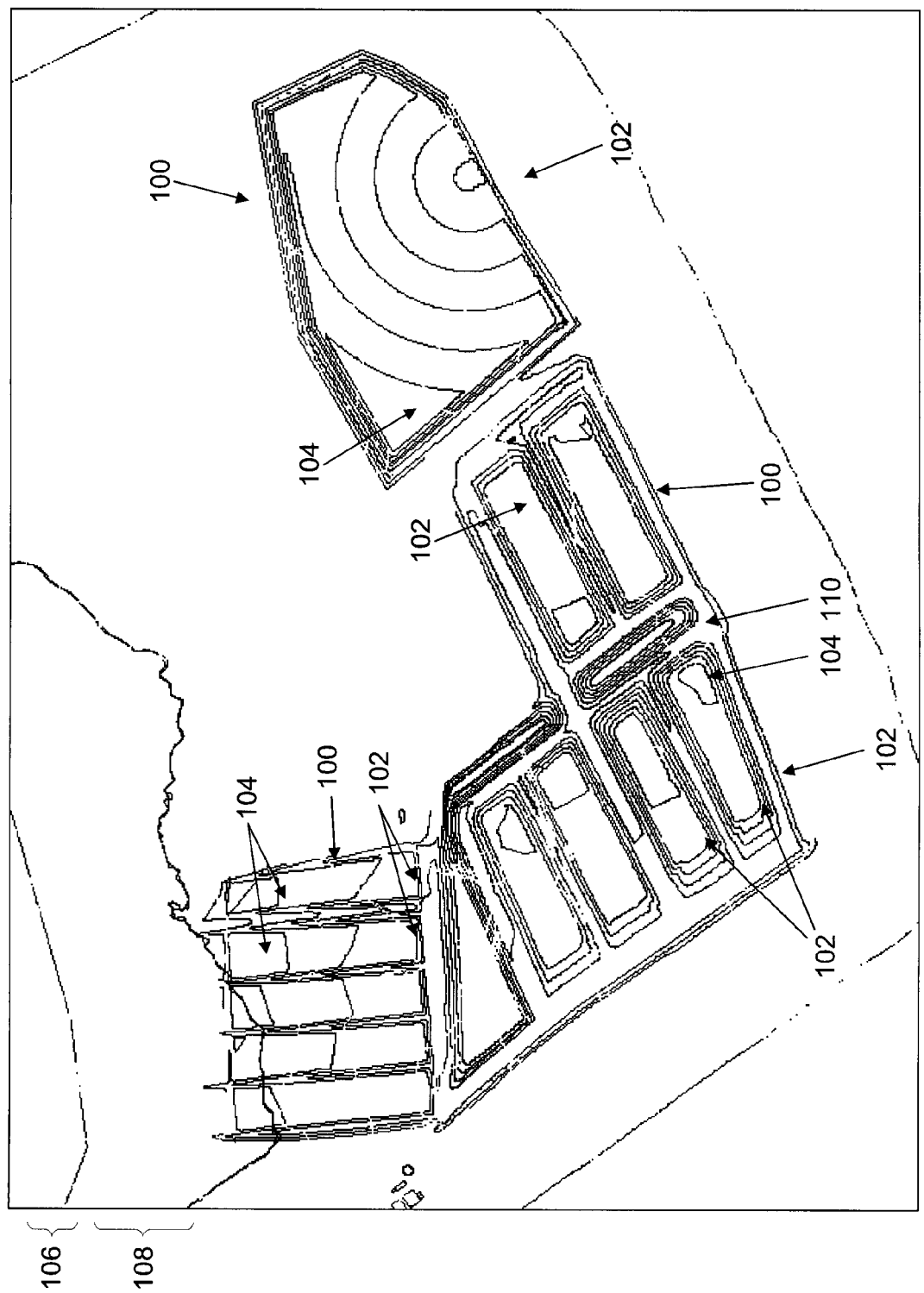
FIG. 1 is a topographical map schematic of various embodiments of deposition cells that may be used with the method of the present invention.

Referring to FIG. 1, the deposition cell 100 may have several different designs. Each cell 100 preferably has a head region 102 at which the modified fine tailings are deposited and a toe region 104 spaced away from the head region 102 by a certain length. The sloped bottom surface extends from the head region 102 to the toe region 104 such that the toe region 104 is at a lower elevation than the head region 102.

In one embodiment, the method first comprises chemically treating raw fine tailings to produce modified fine tailings comprising flocculated fine tailings. A deposition cell is provided comprising a bottom surface having a slope. The chemically modified fine tailings are deposited into the cell such that the slope causes drainage of release water away from the flocculated fine tailings and allows the flocculated fine tailings to stack upward and advance over the bottom surface while having sufficient shear strength on the slope to resist channeling entrainment with the drainage of the release water.

There are various challenges with respect to managing material produced by the MFT flocculation process and maximizing the rate of drying of the material. These challenges relate to the interaction between shear strength and viscosity variability of the modified MFT material produced by the flocculation process, the deposition thickness, the permeability of the modified MFT material, the drainage of released water and precipitation, and the design of cell slope.

Due to the variability of raw MFT feed quality to the MFT flocculation facility and process operating conditions, the physical properties of the modified MFT material that is produced can vary. The variability of properties such as shear strength, viscosity, and permeability can affect the deposition, dewatering and drying performance. For a given deposition cell slope design, shear strength influences the ability of the flocculated MFT to stack on the deposit surface. More particularly, for a given quantity of placed material, the cell slope design influences whether the material will form a thicker lift over a smaller surface area or, conversely, a thinner lift over a larger area. Additional practical operating considerations influence the quantity of material and, hence, lift thickness placed in a given operating period for a given shear strength material. Since part of the MFT drying process relies on evaporation, thicker lifts create a challenge in maximizing the overall rate of drying of the MFT.

The ability of flocculated MFT to build up and advance on the cell slope is also important to separating flocculated MFT from initial release water.

Modified MFT material with insufficiently high shear strength will entrain flocculated MFT in the released water resulting in "channelling" of flow. Channelling has several detrimental impacts to the performance of the MFT drying process. First, the modified MFT will not effectively distribute across the head (deposition) end of the cell resulting in areas of no material being placed. This reduction in land utilization reduces the overall technology efficiency and necessitates greater land requirements for a given production capacity. Second, channelled material may flow to the toe of the cell where it will drain or be pumped back into the pond, thereby reducing fines capture efficiency within the cell. Third, channelled material may entrain or erode previously placed wet flocculated MFT or previously placed dried MFT and entrain this additional material to the toe of the cell where it will be drained back into the pond, again impacting fines capture efficiency.

In one embodiment, the deposited flocculated fine tailings undergo buildup and channelless advancement while allowing drainage of release water. "Channelless advancement" means that the deposit advances over the bottom surface as a substantially uniform entity with minimal or no channelling. Unacceptable channelling occurs when a part of the flocculated tailings has insufficient shear strength for a given cell design and operating conditions, causing a contaminating quantity of flocculated tailings to be entrained in release water which forms one or more localized flow channels which run through the deposit and down the deposition cell and thereby results in contamination of the drainage water.

Conversely, modified MFT material with excessively high shear strength may not effectively spread across the lower regions of the cell surface before operability considerations, such as lift thickness at the head of the cell, force premature termination of material placement in the cell or sub-par water release. This similarly reduces the effective utilization of available surface area and the dewatering potential.

Drainage of both released water and precipitation from the deposit area is another important aspect to efficiency and success of the MFT drying technology. Modified MFT material that sits in ponded water will have little to no driving force to either release further water or undergo evaporation. Design of the cell slope and formation of cell drainage paths are advantageous in managing removal of this water.

For a given cell design, drainage can be further hindered by variability in the raw MFT feed and process conditions that result in the formation of heterogeneous deposits with uneven surface topography. The uneven surfaces create localized opportunities for ponded water to form and negatively impact drying rates. Cell slope design can improve the drainage to a certain degree, but the issue can still persist in some cases.

Regarding the design of cell slope, as the cell slope increases, high shear strength and high stacking angle material will spread more readily leading to a thinner effective deposition lift height which can improve drying rate and improve free water drainage. However, excessive cell slope lowers the shear strength threshold for inducing channelling of flocculated material and hence increases erosion of the cell deposit and reduces fines capture efficiency. Conversely, reducing the cell slope can result in the opposite challenges including increasing the amount of ponded surface water and creating thicker lift material at the head end of the cell. Both of these issues serve to decrease drying rates of the deposited material.

The method of the present invention is an improvement to the management of cell design and post-deposition operations that provides uniform and consistent results across the variable range in flocculated MFT properties that are produced by the MFT flocculation and drying process, allowing advantageous flexibility in operation of the MFT drying operation with minimized negative impact on drying rates.

In an embodiment of the present invention, the method allows channelless advancement of the deposited MFT in a fixed cell slope design despite variability in shear strength of the material.

The deposition cell design and deposition techniques will now be described in further detail.

The deposition cells may have a variety of dimensions. In one embodiment, the cells are approximately 200-250 m long with a cell slope between 1% and 7%. Preferably, the slope may be between 2% and 5%. The cell slope design, in combination with the flocculation and deposition conditions, allows stacking of the flocculated MFT and segregation of released water from flocculated MFT over the range of typical properties of deposited material. The slope is preferably fixed and generally constant from the head to the toe of a given cell. However, the bottom surface may have different slopes in different directions at different locations of the cell and may be straight or curved.

As the shear strength of the flocculated MFT increases, so does its stacking angle. For a given cell slope and given quantity of placed material, this translates into increased lift thickness at the point of deposition (head) and decreased distance of spreading down the length of the cell. Additional considerations for creating a toe region in the cell for collection and drainage of release water without impinging on the deposited MFT factor into the overall design of the cell length. For cell slopes between 1% and 7% and a given targeted lift thickness, it has been found that 200-250 m length cells are advantageous for managing the MFT deposit and release water. According to embodiments of the method, the gentle slopes also enable a cost savings in building and grading.

Experiments have also been conducted with shallower slopes and it was found that this leads to significant ponded water and drainage issues resulting in decreased rates of drying. Experiments have also been conducted using high slopes of about 9% where significant channelling of flow and ineffective dispersal of material across the head end of the cell (reduced land utilization efficiency) were observed.

There are virtually no restrictions on design of cell width. Rather multiple deposition points are used within the cell to maximize dispersal of the flocculated MFT across a given cell width. The spacing between, and hence number of, deposition points within a given cell is dependent on the specific deposition device and can vary from 1 m to 50 m. The number of specific deposition points operated at a given time is determined by optimal operating conditions (target flows) per the specific deposition device in use and the overall flowrate of the MFT drying process. Typically two to three deposition points are used.

In one aspect, the depositing is performed via a plurality of outlets distributed widthwise across the head region of a single cell. In one optional aspect, the outlets may be operated so that the flocculated MFT is expelled from one outlet at a time. In this way, the flocculated MFT is expelled from a first outlet to form a first mound of flocculated fine tailings at the head region. Expelling from the first outlet is ceased when the surface slope of the first mound is sufficient to cause channeling of the modified fine tailings deposited thereon, and a second outlet is then operated to expel the flocculated MFT to form a second mound of flocculated fine tailings beside the first mound. It should be understood that the first and second and subsequent mounds may be directly adjacent to each other or remote from each other as desired. It should also be noted that a set of outlets may be operated to expel flocculated MFT simultaneously until multiple mounds reach a certain height and surface slope before operating another set of outlets.

The layout of cells within a given area may take on a variety of configurations to further improve the overall efficiency especially of land utilization for MFT drying within a given available space. The layout is preferably configured for minimization of unnecessary berms, establishing common drainage ditches, establishing and minimizing common road access paths, and utilizing already present grading to minimize earthworks requirements. The layout may also be configured such that rectangular cells are arranged with head ends abutting to allow discharge from common distribution piping along a centre berm. According to some embodiments, the layout may also be configured such that pipeline sections transporting the flocculated MFT impart sufficient shear conditioning to reach the water release zone (see FIGS. 2 and 3). In the case that some pipeline sections impart shear to bring the flocculated MFT only to the flocculation conditioning zone, the outlet of the corresponding pipeline section may be provided with a mechanical shearing mechanism or the deposit at that location may be plowed according to various post-deposition "farming" techniques that will be further described below.

In one embodiment of cell design represented in FIG. 1, the cells 100 may be rectangular and may be typically about 50 m wide by 200-250 m long. These cells 100 may be arranged side by side over a given beach surface area and can either be arranged along the pond edge for direct drainage of release water into the pond. Such arrangements allow open discharge to a pond 106 via a pond beach area 108. The cells 100 may also be arranged in rows with the toe end 104 of the cells 100 abutting onto each other to share a common drainage ditch 110.

In another embodiment of cell design also represented in FIG. 1, the cells 100 may be "radial" having a central deposition point that discharges in a radial arc. The arc may be up to 180° as illustrated, or in some cases up to 360° when the cell is configured essentially as a conical hill. The cell slope is best described as cone shaped in that it has a 1-7% slope outwards in a linear direction from the deposition point much like a cone. The cell surface area may be additionally sloped in a second direction towards a common corner of the conical cell for accumulation and drainage of release water through a single collection point.

These radial cells enhance distribution of MFT over the cell surface area by having a cell width that increases with length into the cell. Due to single point discharge mechanisms, flocculated MFT flow slowly spreads outward as it travels the length of the cell. This results in unutilized area at the head of the cell where spreading is minimal. A radial cell thus can improve surface area utilization over a rectangular cell.

Average deposit lift thicknesses are targeted to between 20 cm and 50 cm. This has been found to be an advantageous balance between optimizing drying rates and practical implementation. The upper limit is restricted by the strength of the material and the need to create a lift thin enough to dry in a reasonable time frame. The lower limit is restricted by practical operability and design considerations including frequency of valve switches between cells and quantity of piping. Thinner lifts equate to shorter deposit spread lengths which, in-turn, translate into more cells per given surface area and hence more piping to access each cell and associated reduction in land utilization due to increased piping corridors and road access points.

Experiments have also been conducted with lifts as deep as 1 m and it was found that this thickness does not dry as advantageously as lifts between 20 cm and 50 cm.

There are also some post-deposition "farming" techniques that may be used to improve the MFT drying. The post-deposition techniques enhance both the distribution of flocculated MFT over the cell area and the drying rate of the deposited material.

Preferably, plowing and harrowing are both used at the appropriate times after the deposition has been performed as described herein. However, it should be understood that plowing or harrowing may be performed following other schemes of MFT deposition.

In some preferred embodiments, the method implements the use of mechanical equipment including plow devices and disc harrows to address challenges relating to thick deposits and surface water drainage. These techniques may also provide advantages when the MFT is not optimally flocculated or sheared.

The plowing is preferably performed while the deposit is still wet at its upper surface. Preferably, the plowing is performed using a plow device that acts to spread flocculated MFT, post-deposition, uniformly over the cell area, thereby placing material in areas where the flocculated MFT did not spread including regions at the bottom/toe of the cell and regions along the width at the head end of the cell, and moving material placed in a thick lift at the head end of the cell towards the toe end where the lift thickness is much thinner. The plowing has the additional advantageous effect of allowing water release conditioning, when necessary in the given deposit, while avoiding over-shearing and maintaining sufficient shear strength of the flocculated fine tailings to allow standing. Thus, the plowing is preferably preformed using a mechanism that can provide a controlled amount of shear uniformly across the deposit, rather than a high-shear local agitation device.

The plow device may comprise a cross-member extending across the cell and displacement means for displacing the cross-member toward the toe of the cell while it pulls high material toward the toe and allows the material to fill low areas of the cell. The plow device may have a concave surface facing the toe for improving the scooping action of the deposited material and an appropriate amount and distribution of shear. For example, the plow device may be constructed from piping cut lengthwise to form a semi-circular piece of half-pipe. This half-pipe is attached to a rig that supports it at a given height, such as between 8 and 18 inches above the ground surface, and allows the assembly to be attached to a dozer or other displacement mechanism. The half-pipe is sunk into the deposit to the proper depth and the dozer drags the half-pipe plow through the deposit thereby pulling material from a location where it is thicker to a location where less material is present, thereby creating a generally uniform thickness deposit.

The plowing and spreading of the material can improve drying rates through a plurality of actions. First, it improves land utilization. Areas that had no placed MFT are now being used thereby increasing surface area for evaporation. Second, in suboptimally flocculated MFT, it provides opportunity for release water that is trapped subsurface in the flocculated MFT to reach the surface and evaporate, thereby improving drying rates. Third, in undersheared MFT deposits, the activity of the plow may be sufficient to provide extra shear to the deposit and allow the material to reach a dewatering (water release) state. Undermixed or undersheared deposits would otherwise only be subject to evaporation processes if left unplowed.

It has been seen through operation of MFT drying that a majority of the water released through the dewatering phase occurs in the first couple of days upon deposition. After the first couple of days, dewatering rates taper off and evaporation processes start to dominate the rate of drying. In some embodiments, because over-aggressive plowing has the potential to overshear flocculated MFT, thereby hindering the dewatering process, it has been found that it is advantageous to implement plowing of cells no sooner than two days after deposition. This allows for maximized dewatering rates prior to implementing plow operations to enhance evaporation processes for such embodiments. In rare cases, if a very high shear strength material is placed in a shallow slope area, a very thick lift may form during operations at the point of deposition, and thus earlier plowing may be appropriate. Practical considerations may also lead to the use of the plow during deposition to aid in spreading of the material.

According to another farming technique, the harrowing is performed once a dried crust has formed at the upper surface of the deposit. Once the dewatering phase of the MFT drying technology is complete and the evaporation process has begun, a crust layer begins to form on the MFT deposit. The permeability of the flocculated MFT leads to both trapped release water as well as deposit moisture below the crust layer will not readily migrate to the surface for drainage and evaporation. The deposit has relatively low permeability compared to coarse tailings, containing higher contents of sand or coarse particles, resulting at a certain point in the process in slower water migration rates such that evaporative mechanisms become more dominant. For thicker lift deposits, trapped release water and deposit moisture below the crust can result in lengthy drying times. In ideally dosed and ideally mixed/sheared MFT, the deposited material will form cracks that create drainage channels and expose further surface area for evaporation. This aids in accelerating the drying rate. However, the ideal dosing and mixing range may be narrow with some chemical addition techniques, creating a practical challenge in achieving ideal dosing and mixing under all operating conditions. Given a variety of process fluctuations including MFT density, MFT flowrate, bitumen content, and piping distance to the specific cell, either or both the dose and the mixing could be substandard resulting in some under- or over-dosed material or some under- or over-sheared flocculated MFT. As a result, crack formation and the benefit it provides to MFT drying rates is not always achievable.

To accelerate the rate of drying in non-ideal dosing or mixing scenarios, the present invention provides a harrowing method in flocculated MFT deposits. In one embodiment, a conventional farm disc harrow device is attached to a dozer and dragged through the deposit. Disc harrowing is applied once a dry crust layer has formed and is utilized to turn over the surface layer of the deposit and expose the wet material under the crust layer. This serves to maximize the overall rate of evaporation of water from the deposit. If disc harrowing is executed in a lengthwise direction through the deposit it has the added benefit of creating furrows that act as drainage paths to the toe of the cell helping in alleviating ponded water from shallow sloped or non-heterogeneous areas of the deposit thereby improving drying rates.

The farming techniques have provided numerous observed advantages. They create a uniform deposit thickness over the entire cell area, thereby maximizing surface area utilization and maximizing drying rates over the entire cell. They facilitate the drainage of ponded surface water and the release and drainage of free water trapped below the dried surface of the deposit. They allow overturning of dried surface material to expose wet material underneath thereby enhancing the rate of evaporation mechanisms. They synergistically enable improved timing of substantially gravity-controlled drainage dewatering and substantially evaporation-controlled drying of the deposited MFT.

The present invention also provides a number of options for final handling of the deposited flocculated MFT to tailor the MFT drying process to site specific conditions and available solids disposal options.

One deposit handling option is referred to as in-situ deposition. Deposited material is left in-place in the deposition cell and a subsequent deposit lift is placed over top using the above described methodologies. Prior to a subsequent lift, the material in the drying cell preferably achieves a moisture content of less than about 25% by weight to promote geotechnical stability. Depending on the specific chemical used to modify the MFT, the relationship between the geotechnical properties and moisture content may vary. In-situ material can be left in place indefinitely.

Another deposit handling option is excavation. Flocculated MFT has sufficient shear strength to be excavated as a solid material as early as four days post deposition provided. Depending on specific objectives, this material can be disposed in a mud dump or spread on secondary drying areas for mechanical manipulation using disc harrowing techniques as described above. This allows quick turnover of the deposition cell for re-use thereby minimizing the number of active cells for a given operation.

Materials can also be excavated once dried to over 75 wt % solids.

In another embodiment, the cycle time period of depositing the modified tailings is controlled so that each deposition cell is filled to the desired lift over a time period not exceeding about one day. When the deposition occurs over a longer timeframe, the initially deposited material begins to release water out of the top of the material, creating a 20-40 mm liquid film on which subsequently deposited material flows more quickly. Thus, the modified fine tailings are preferably deposited over a timeframe sufficient to avoid significant water release film formation on the top of the material during deposition, allowing the deposit to dewater and dry as a substantially unitary aggregate.

As mentioned in a previous section, the deposition and farming methods of the present invention are used in conjunction with chemically altering raw oil sand fine tailings to produce modified fine tailings.

A preferred technique of producing the modified fine tailings through flocculation and subsequent pipeline handling and conditioning will now be described. This preferred technique will be referred to herein below as the "flocculation process" or the "flocculation technique".

Figure 2:
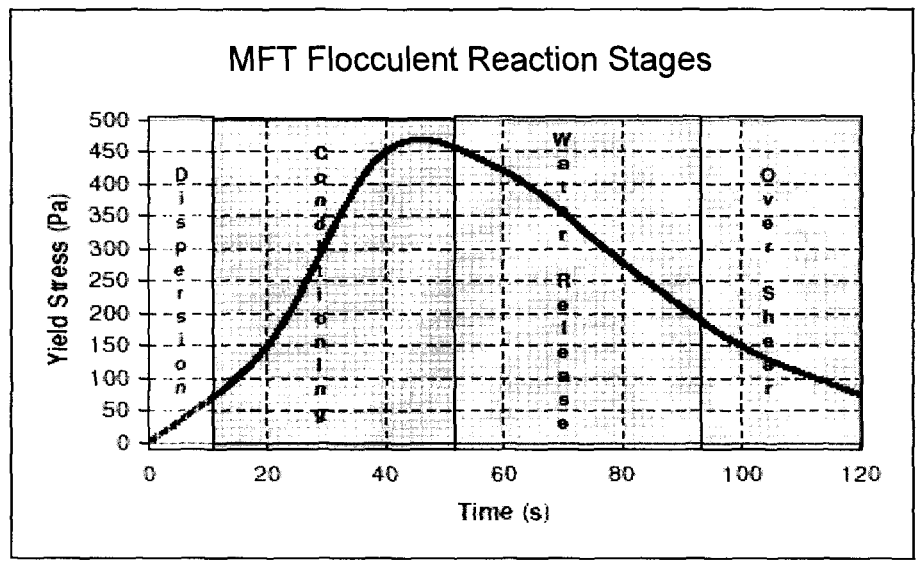
FIG. 2 is a general representative graph of shear yield stress versus time showing the process stages for an embodiment of an MFT flocculation technique.
Figure 3:
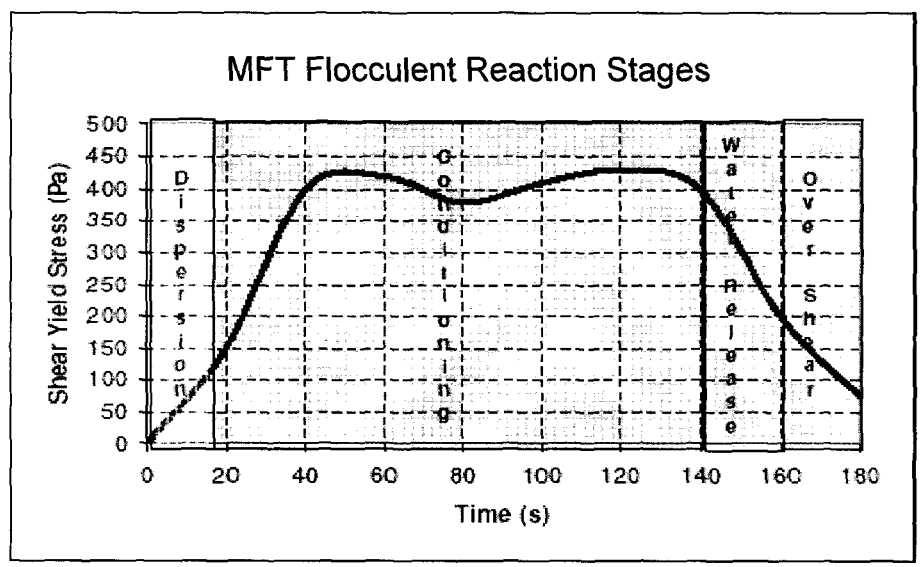
FIG. 3 is a general representative graph of shear yield stress versus time showing the process stages for another embodiment of the flocculation technique.

Referring to FIGS. 2 and 3, the general stages of the flocculation process will be described. The oil sand fine tailings are treated with a flocculent solution by in-line dispersion of the flocculent solution into the fine tailings, then conditioning the fine tailings by inputting a sufficient energy to cause the formation and rearrangement of flocculated fine tailing solids to increase the yield shear strength while enabling water release without over-shearing the flocculated solid structure that can then form a non-flowing deposit. The flocculated fine tailings are then deposited and may be farmed to promote the water release and allowed to dry.

Certain terms employed hereinbelow should be read in light of the following additional definitions:

"In-line flow" means a flow contained within a continuous fluid transportation line such as a pipe or another fluid transport structure which preferably has an enclosed tubular construction.

"Flocculent solution comprising a flocculation reagent" means a solution comprising a solvent and at least one flocculation reagent. The flocculent solution may contain a combination of different flocculation reagents, and may also include additional chemicals. The solvent comprises water but may include other compounds as well, as desired. Flocculation reagents are compounds that have structures which form a bridge between particles, uniting the particles into random, three-dimensional porous structures called "flocs". Thus, the flocculation reagents do not include chemicals that merely act electrostatically by reducing the repulsive potential of the electrical double layer within the colloid. The flocculation reagents have structures for forming floc arrangements upon dispersion within the MFT, the flocs being capable of rearranging and releasing water when subjected to a specific window of conditioning. The preferred flocculation reagents may be selected according to given process conditions and MFT composition.

"Molecular weight" means the average molecular weight determined by measurement means known in the art.

"Dispersion", as relates to the flocculent solution being introduced into the in-line flow of MFT, means that upon introduction within the MFT the flocculent solution transitions from droplets to a dispersed state sufficient to avoid under-reacting or over-reacting in a localized part of the MFT which would impede completion of the flocculation in the subsequent conditioning stage to reliably enable dewatering and drying.

"Flocculation conditioning" is performed in-line and involves the flocculation reagent reacting with the MFT solids to form flocs and through rearrangement reactions increase the strength of the flocculating MFT.

"Water release conditioning" means that energy is input into the flocculated MFT so as to initiate rearrangement and breakdown of the structure to release water from the flocculated matrix. The energy input may be performed by in-line shearing or by other means. "Release of water" in this context means that water selectively separates out of the flocculated MFT matrix while leaving the flocs sufficiently intact for deposition.

"Over-shearing", which is a stage that defines the limit of the water release conditioning stage and is to be avoided, means that additional energy has been input into the flocculated MFT resulting in dispersing the structure and resuspending the fines within the water. Over-sheared MFT releases and resuspends fines and ultrafines entrapped by the flocs back into the water, essentially returning to its original fluid properties but containing non-functional reagent.

"Non-flowing fine tailings deposit" means a deposited flocculated MFT that has not been over-sheared and has sufficient strength to stand within a cell while drying. While the water release from the flocs is triggered by conditioning, the MFT deposit may have parts that continue to release water after it has been deposited. The drying of the MFT deposit may then occur by gravity drainage, evaporation and permeation. The removal of water from the flocculated MFT may also occur before deposition, for instance when a stream of release water separates from the flocculated MFT upon expelling for deposition.

"Yield shear strength" means the shear stress or pressure required to cause the MFT to flow.

In the flocculation technique, the oil sand fine tailings are primarily MFT obtained from tailings ponds given the significant quantities of such material to reclaim. The raw MFT may be pre-treated depending on the downstream processing conditions. For instance, oversized materials may be removed from the raw MFT. In addition, specific components of the raw MFT may be selectively removed depending on the flocculation reagent to be used. For instance, when a cationic flocculation reagent is used, the raw MFT may be treated to reduce the residual bitumen content which could cause flocculent deactivation. The raw MFT may also be pre-treated to provide certain solids content or fines content of the MFT for treatment or hydraulic properties of the MFT. The fine tailings may also be obtained from ongoing oil sand extraction operations. The MFT may be supplied from a pipeline or a dedicated pumped supply.

The flocculation technique is preferably conducted in a "pipeline reactor" followed by deposition onto a deposition area. The pipeline reactor may have various configurations, some of which will be described in detail herein below.

Figure 4:
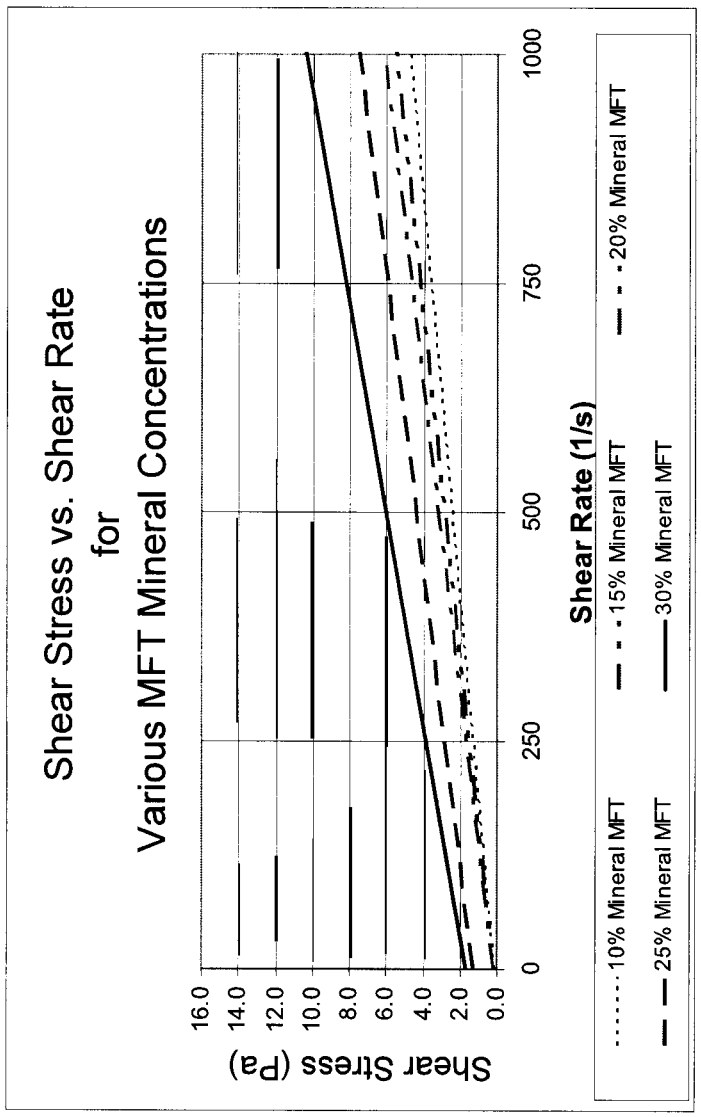
FIG. 4 is a graph showing the relationship between shear stress and shear rate for an MFT sample, illustrating the non-Newtonian nature of MFT at higher solids contents.

The MFT to be treated is preferably provided as an in-line flow in an upstream part of the pipeline reactor. The properties of the MFT and its particular flow characteristics will significantly depend on its composition. At low mineral concentrations the yield stress to set the MFT fluid in motion is small and hydraulic analysis can approximate the fluid behaviour of a Newtonian fluid. However, as mineral concentration increases a yield stress must be overcome to initiate flow. These types of fluids are a class of non-Newtonian fluids that are generally fitted by models such as Bingham fluid, Herschel-Bulkley yield-power law or Casson fluid. The rheological relationship presented in FIG. 4, illustrating a yield stress response to shear rate for various mineral concentrations in a MFT sample, considers MFT as a Bingham fluid. MFT may also be modelled in viscometric studies as a Herschel-Bulkley fluid or a Casson Fluid.

Empirical data and modelling the rheology of in-line MFT have confirmed that when a flocculent solution is added by conventional side injection into a Bingham fluid MFT, solution dispersion is very sensitive to flow rate and diameter ratios as well as fluid properties.

Particularly when the flocculent solution is formulated to behave as a non-Newtonian fluid, the dispersion stage of the flocculation technique may be performed to cause rapid mixing between two non-Newtonian fluids. Rapid non-Newtonian mixing may be achieved by providing a mixing zone which has turbulence eddies which flow into a forward-flow region and introducing the flocculent solution such that the turbulence eddies mix it into the forward-flow region. Preferably, the flocculent solution is introduced into the turbulence eddies and then mixes into the forward-flow region.

Figure 5:
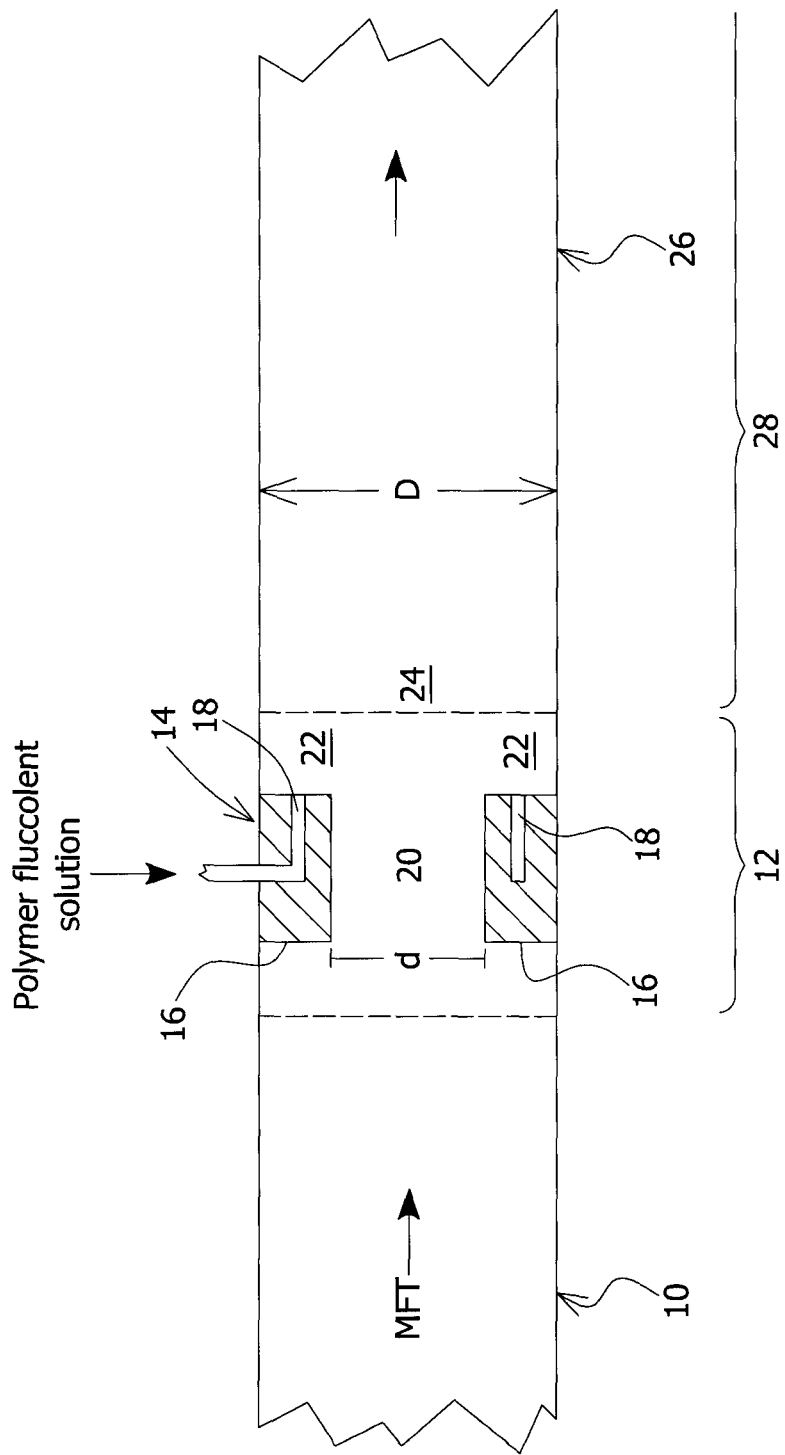
FIG. 5 is a side cross-sectional view of a pipeline reactor for use with embodiments of the method of the present invention.
Figure 6:
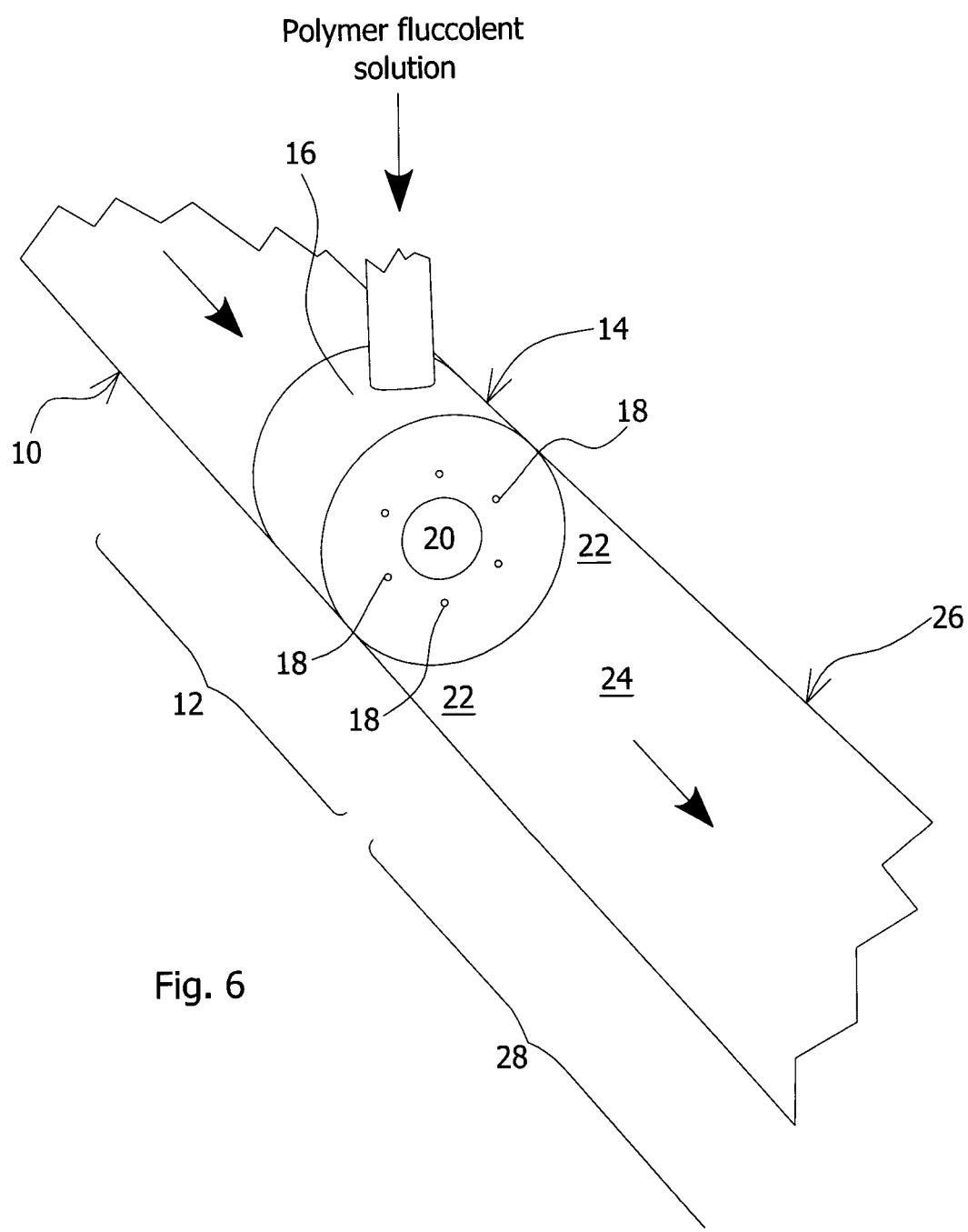
FIG. 6 is a partial perspective transparent view of a pipeline reactor for use with embodiments of the method of the present invention.

FIGS. 5 and 6 illustrate a pipeline reactor design that enables such rapid mixing of non-Newtonian fluids. The MFT is supplied from an upstream pipeline 10 into a mixing zone 12. The mixing zone 12 comprises an injection device 14 for injecting the flocculent solution. The injection device may also be referred to as a "mixer". The injection device 14 may comprise an annular plate 16, injectors 18 distributed around the annular plate 16 and a central orifice 20 defined within the annular plate 16. The MFT accelerates through the central orifice 20 and forms a forward-flow region 24 and an annular eddy region 22 made up of turbulence eddies. The injectors 18 introduce the flocculent solution directly into the eddy region 22 for mixing with the turbulent MFT. The recirculation of the MFT eddies back towards the orifice 20 results in mixing of the flocculent solution into the MFT forward-flow. The forward-flow region 24 expands as it continues along the downstream pipe 26. For some mixer embodiments, the forward-flow region may be a vena-contra region of a jet stream created by an orifice or baffle. The main flow of the MFT thus draws in and mixes with the flocculent solution, causing dispersion of the flocculent solution, and flocculation thus commences in a short distance of pipe. The injection device 14 illustrated in FIGS. 5 and 6 may also be referred to as an "orifice mixer". For the mixer of FIGS. 4 and 5, the preferred range of orifice diameter "d" to downstream pipe diameter "D" is 0.25-0.75.

Figure 7:
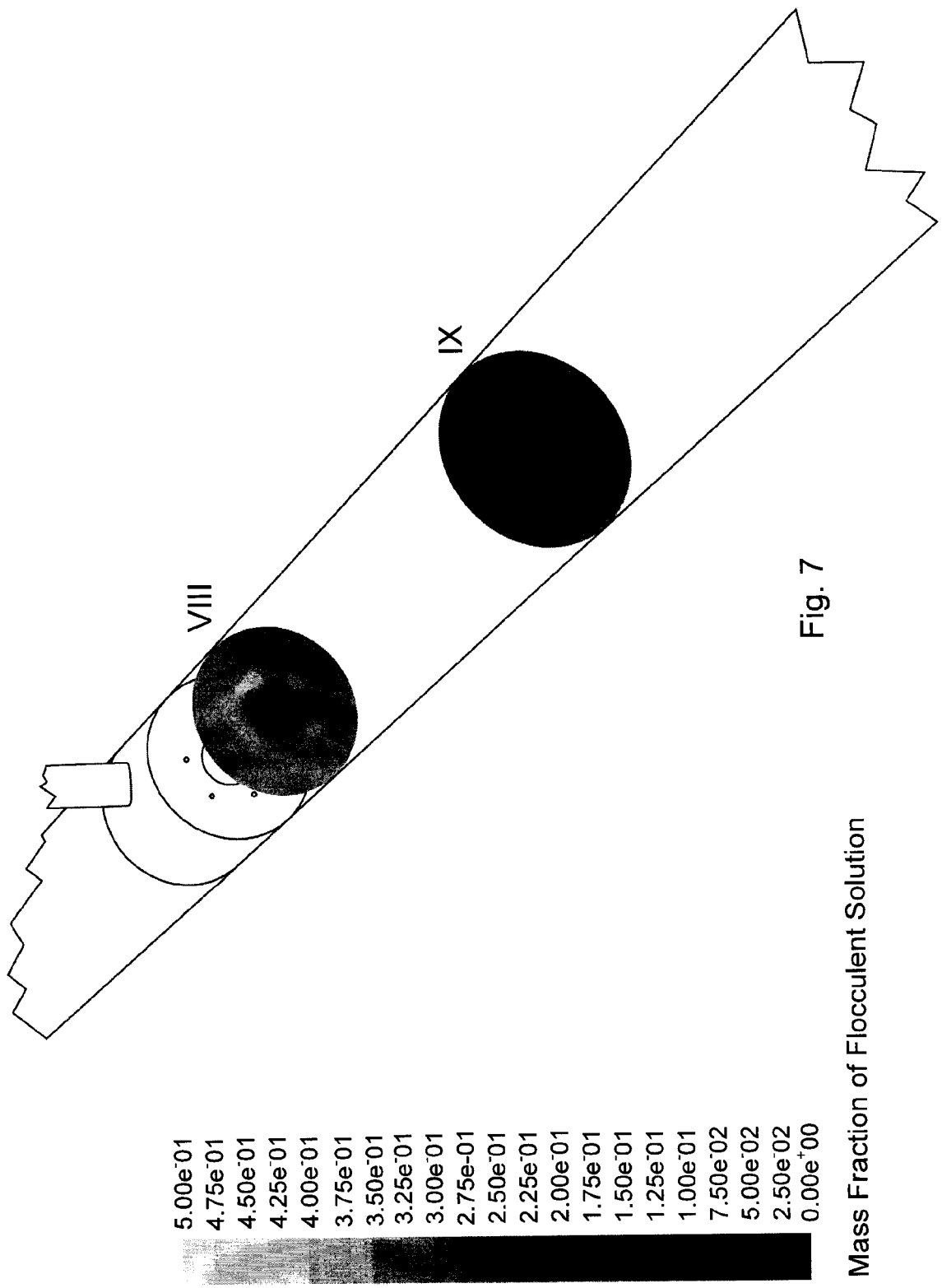
FIG. 7 is a partial perspective transparent view of the pipeline reactor of FIG. 6 with cross-sections representing the relative concentration of flocculent solution and MFT at two different distances from the injection location.
Figure 9:
FIG. 9 is a close-up view of section IX of FIG. 7.

FIGS. 7-9 illustrate the performance of an orifice mixer based on computational fluid dynamic (CFD) modeling and empirical data obtained from a test installation on a MFT pipeline reactor. The MFT flow rate in a 2 inch diameter pipe was 30 LPM and flocculent solution was injected at about 3 LPM. The 2 inch long orifice mixer had an orifice to downstream pipe diameter ratio d/D=0.32 with six 0.052 inch diameter injectors located on a 1.032 inch diameter pitch circle. Due to the density difference between the MFT and flocculent solution, a useful method of characterizing the degree of mixing is to determine the second moment M of the concentration C over the pipe cross section A in the following equation where $\overline{C}$ is the mean concentration for the fully mixed case (thus directionally M=0 is desired).

$$M = \frac{1}{A}\int_A \left(\frac{C}{\overline{C}} - 1\right)^2 dA$$

In FIGS. 7-9, the dark areas represent MFT that has not mixed with the flocculent solution (referred to hereafter as "unmixed MFT"). Just downstream of the mixer, the unmixed MFT region is limited to the central core of the pipe and is surrounded by various flocculent solution-MFT mixtures indicative of local turbulence in this zone. As the flocculent solution is miscible in MFT, the jetting of the flocculent solution into the turbulent zone downstream may cause the flocculent solution to first shear the continuous phase into drops from which diffusion mixing disperses the flocculent into the MFT.

The CFD model was based on a Power-law-fluid for the flocculent solution and a Bingham-fluid for the MFT without reactions. The Bingham-fluid approximation takes into account the non-Newtonian nature of the MFT as requiring a yield stress to initiate flow. Bingham-fluids are also time-independent, having a shear stress independent of time or duration of shear. Preferably, the CFD model is primarily used to determine and improve initial mixing between the flocculent solution and the MFT.

Figure 10:
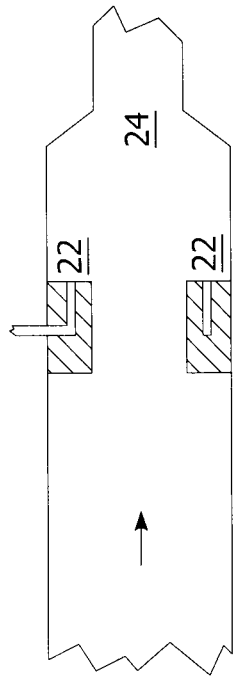
FIG. 10 is a side cross-sectional view of a variant of a pipeline reactor for use with embodiments of the method of the present invention.
Figure 11:
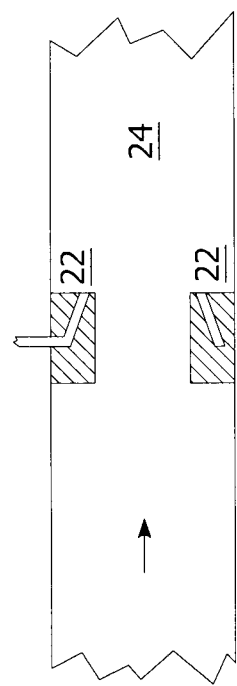
FIG. 11 is a side cross-sectional view of another variant of a pipeline reactor for use with embodiments of the method of the present invention.
Figure 12:
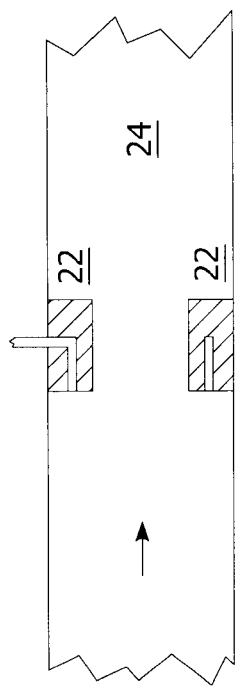
FIG. 12 is a side cross-sectional view of another variant of a pipeline reactor for use with embodiments of the method of the present invention.
Figure 13:
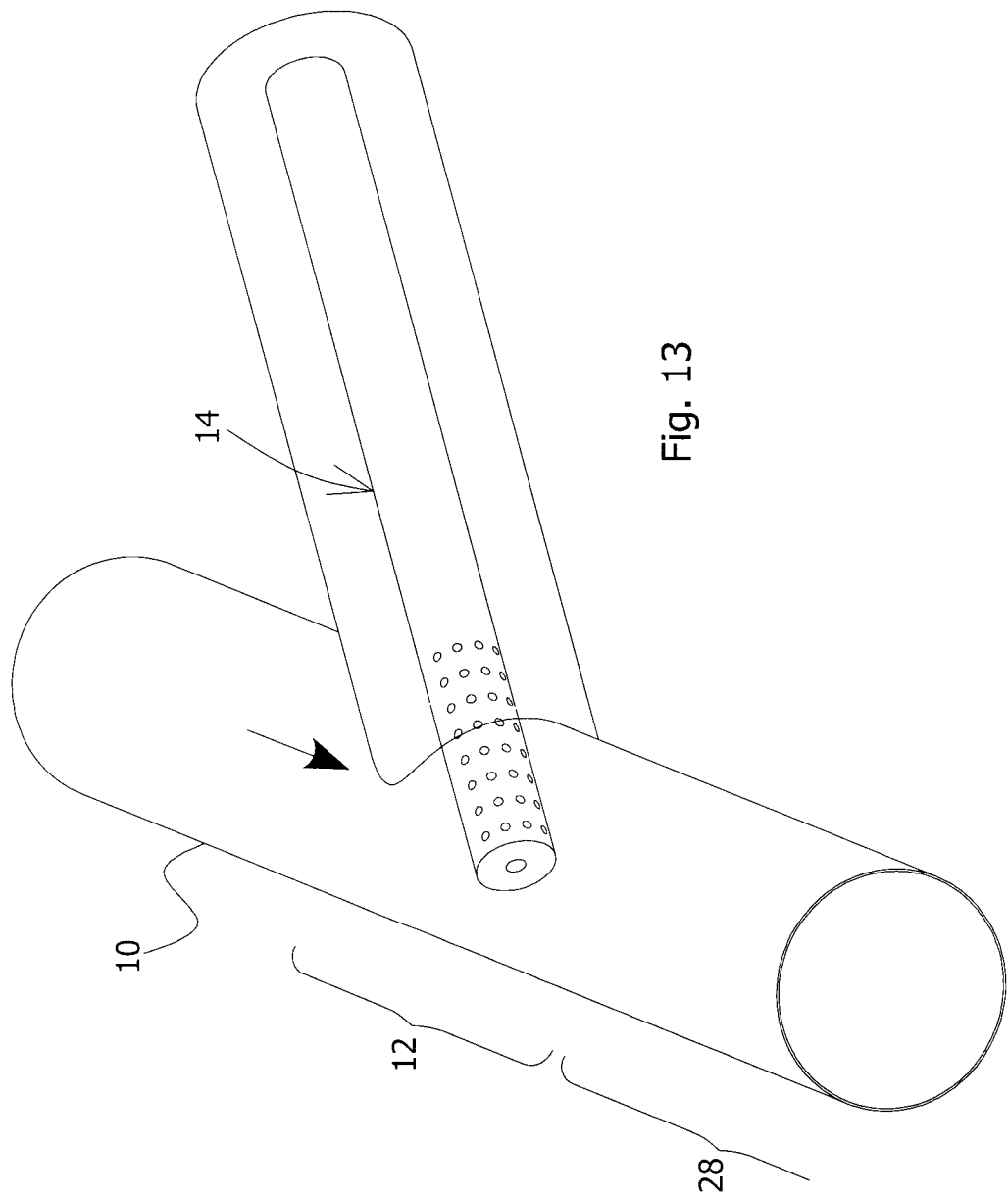
FIG. 13 is a partial perspective transparent view of yet another variant of a pipeline reactor for use with embodiments of the method of the present invention.

The injection device 14 may have a number of other arrangements within the pipeline reactor and may include various elements such as baffles (not shown). In one optional aspect of the injection device shown in FIG. 10, at least some of the injectors are oriented at an inward angle such that the flocculent solution mixes via the turbulence eddies and also jet toward the core of the MFT flow. In another aspect shown in FIG. 11, the orifice has a reduced diameter and the injectors may be located closer to the orifice than the pipe walls. The injectors of the mixer may also be located at different radial distances from the centre of the pipeline. In another aspect, instead of an annular plate with a central orifice, the device may comprise baffles or plates having one or multiple openings to allow the MFT to flow through the mixing zone while creating turbulence eddies. In another aspect shown in FIG. 12, the injectors face against the direction of MFT flow for counter-current injection. FIG. 13 illustrates another design of injection device that may be operated in connection with the flocculation process. It should also be noted that the injection device may comprise more than one injector provided in series along the flow direction of the pipeline. For instance, there may be an upstream injector and a downstream injector having an arrangement and spacing sufficient to cause the mixing. In a preferred aspect of the mixing, the mixing system allows the break-up of the plug flow behaviour of the Bingham fluid, by means of an orifice or opposing "T" mixer with MFT and flocculent solution entering each arm of the Tee and existing down the trunk. Density differentials (MFT density depends on concentration ~30 wt % corresponds to a specific gravity of ~1.22 and the density of the flocculent solution may be about 1.00) together with orientation of the injection nozzles play a role here and are arranged to allow the turbulence eddies to mix in and disperse the flocculent solution.

The following table compares the second moment values for the orifice mixer (FIG. 4) and a quill mixer (FIG. 13) at various locations downstream of the injection location for the same flows of MFT and flocculent reagent solution.

| Downstream Distance | M | |
| --- | --- | --- |
| L/D | Orifice Mixer (FIG. 4) | Quill Mixer (FIG. 12) |
| 1 | 11.75 | 5.75 |
| 2 | 3.17 | 3.65 |
| 3 | 1.75 | 2.89 |
| 5 | 1.10 | 2.24 |
| 10 | 0.65 | 1.39 |

Near to the injection point of the orifice mixer as shown on FIG. 8, there is a larger region of unmixed polymer surrounding a strong MFT jet with a "M" value of 11.75. However, the mixing with the MFT jet occurs very rapidly so that by 5 diameters downstream of the injection point shown as FIG. 9 with a second moment M value of 1.10. In contrast, for the quill mixer as shown FIG. 13, the initial mixing with a second moment M value of 5.75 only improves to 2.24 by 5 diameters downstream of the injection point. Mixing by the orifice mixer is preferred to the quill mixer.

Preferably, the mixing is sufficient to achieve an M<2 at L/D=5, and still preferably the mixing is sufficient to achieve an M<1.5 at L/D=5, for the pipeline reactor. Controlling the mixing at such preferred levels allows improved dispersion, flocculation and dewatering performance.

In this flocculation technique, initial mixing of the flocculent solution into the MFT is important for the flocculation reactions. Upon its introduction, the flocculent solution is initially rapidly mixed with the fine tailings to enhance and ensure the flocculation reaction throughout the downstream pipeline. When the flocculent solution contacts the MFT, it starts to react to form flocs made up of many chain structures and MFT minerals. If the flocculent solution is not sufficiently mixed upon introduction into the pipe, the flocculation reaction may only develop in a small region of the in-line flow of tailings. Consequently, if the tailings are subsequently mixed downstream of the polymer injection, mixing will be more difficult since the rheology of the tailings will have changed. In addition, the flocs that formed initially in the small region can be irreversibly broken down if subsequent mixing imparts too much shear to the flocs. Over-shearing the flocs results in resuspending the fines in the water, reforming the colloidal mixture, and thus prevents water release and drying. Thus, if adequate mixing does not occur upon introduction of the flocculent solution, subsequent mixing becomes problematic since one must balance the requirement of higher mixing energy for flocculated tailings with the requirement of avoiding floc breakdown from over-shearing.

The initial mixing may be achieved and improved by a number of optional aspects of the flocculation process. In one aspect, the injection device is designed and operated to provide turbulence eddies that mix and disperse the flocculent solution into the forward flow of MFT. In another aspect, the flocculation reagent is chosen to allow the flocculent solution to have decreased viscosity allowing for easier dispersion. The flocculent solution may also be formulated and dosed into the MFT to facilitate dispersion into the MFT. Preferably, the flocculation reagent is chosen and dosed in conjunction with the injection conditions of the mixer, such that the flocculent solution contains sufficient quantity of reagent needed to react with the MFT and has hydraulic properties to facilitate the dispersion via the mixer design. For instance, when a viscous flocculent solution displaying plastic or pseudo-plastic non-Newtonian behaviour is used, the mixer may be operated at high shear injection conditions to reduce the viscosity sufficiently to allow dispersion into the MFT at the given hydraulic mixing conditions. In yet another aspect, the flocculation reagent is chosen to form flocs having increased shear resistance. Increased shear resistance enables more aggressive, harsh mixing and reduces the chance of premature over-shearing of the resulting flocs. The increased shear resistance may be achieved by providing the flocculent with certain charge characteristics, chain lengths, functional groups, or inter- or intra-linking structures. In another aspect, the flocculation reagent is chosen to comprise functional groups facilitating rearrangement and selective water release. In another aspect, the flocculation reagent is chosen to form large flocs facilitating rearrangement and partial breakdown of the large flocs for water release. In another aspect, the flocculation reagent may be an organic polymer flocculent. The polymer flocculent may have a high molecular weight, such as above 10,000,000, or a low molecular weight. The high molecular weight polymers may tend to form more shear resistant flocs yet result in more viscous flocculent solutions at the desired dosages. Thus, such flocculent solutions may be subjected to higher shear injection to reduce the viscosity and the turbulence eddies may be given size and spacing sufficient to disperse the flocculent solution within the pipeline mixing zone.

In another aspect, the flocculation reagent may be chosen and dosed in response to the clay concentration in the MFT. The flocculation reagent may be anionic, cationic, non-ionic, and may have varied molecular weight and structure, depending on the MFT composition and the hydraulic parameters.

It should be noted that, contrary to conventional teachings in the field of MFT solidification and reclamation, the improvement and predictability of the drying process rely more in the process steps than in the specific flocculation reagent selected. Of course, some flocculation reagents will be superior to others at commercial scale, depending on many factors. However, the flocculation process enables a wide variety of flocculation reagents to be used, by proper mixing and conditioning in accordance with the process steps. By way of example, the flocculent reagent may be an organic polymer flocculent. They may be polyethylene oxides, polyacrylamides, anionic polymers, polyelectrolytes, starch, copolymers that may be polyacrylamide-polyacrylate based, or another type of organic polymer flocculents. The organic polymer flocculents may be obtained from a flocculent provider and subjected to selection to determine their suitability to the specific commercial application.

Figure 14:
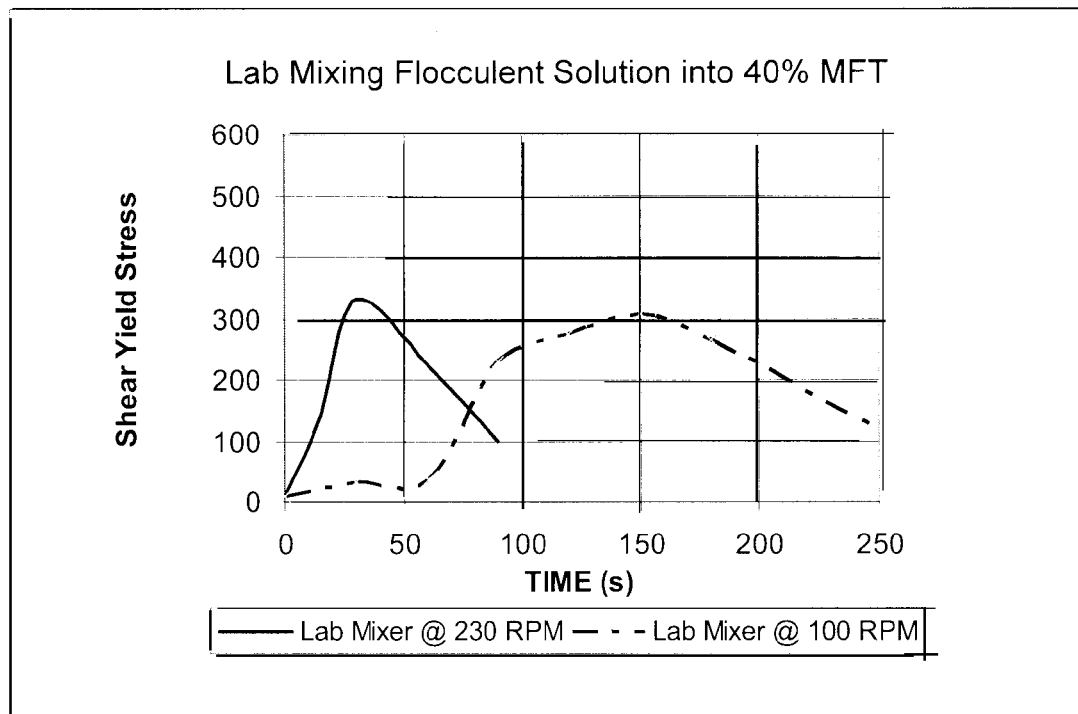
FIG. 14 is a graph of shear yield stress versus time comparing different mixing speeds in a stirred tank for mature fine tailings treated with flocculent solution.

Initial mixing was further assessed in a conventional stirred mix tank by varying the initial speed of the mixer. FIG. 14 presents indicative lab test results comparing rapid mixing (230 RPM) and slow mixing (100 RPM). The test results with the mixer at the higher initial speed developed flocculated MFT with a higher shear yield strength significantly faster than tests with the mixer at a lower speed. For the lower speed, the time delay was attributable to dispersing the flocculent solution into the MFT. Moreover, FIG. 15 indicates that the fast initial mixing also resulted in higher initial water release rates, which results in reduced drying times.

While the lab scale stirred tank demonstrated benefits from fast mixing, other results also demonstrated the effect of over-mixing or over-shearing, which would break down the flocculated MFT such that the MFT would not dewater. The lab scale stirred tank is essentially a batch back-flow reactor in which the mixer imparts shear firstly to mix the materials and secondly to maintain the flocculating particles in suspension while the reactions proceed to completion. As the operational parameters can be easily adjusted, the stirred tank provides a valuable tool to assess possible flocculation reagent performance. Lab scale stirred tank data may be advantageously coupled with lab pipeline reactor tests and CFD modelling for selecting particular operating parameters and flocculation reagents for embodiments of the continuous in-line process of the flocculation process.

The MFT supplied to the pipeline reactor may be instrumented with a continuous flow meter, a continuous density meter and means to control the MFT flow by any standard instrumentation method. An algorithm from the density meter may compute the mineral concentration in MFT and as an input to the flow meter determine the mass flow of mineral into the pipeline reactor. Comparing this operating data to performance data for the pipeline reactor developed from specific flocculation reagent properties, specific MFT properties and the specific pipeline reactor configurations, enables the adjustment of the flowrate to improve processing conditions for MFT drying. Operations with the mixer in a 12 inch pipe line processing 2000 USgpm of MFT at 40% solids dewatered MFT with a pipe length of 90 meters.

Referring back to FIGS. 5 and 6, after introduction of the flocculation reagent in the mixing zone 12, the flocculating MFT continues into a conditioning zone 28. The conditioning stage of the flocculation process will be generally described as comprising two main parts: flocculation conditioning and water release conditioning.

At this juncture, it is also noted that for Newtonian fluid systems, research into flocculated systems has developed some tools and relationships to help predict and design processes. For instance, one relationship that has been developed that applies to some flocculated systems is a dimensionless number called the "Camp number". The Camp number relates power input in terms of mass flow and friction to the volume and fluid absolute viscosity. In non-Newtonian systems such as MFT-polymer mixing both pipe friction and the absolute viscosity terms used in the Camp number depend on the specific flow regime. The initial assessment of the pipeline conditioning data implies the energy input may be related to modified Camp number. The modified Camp number would consider the flocculating agent, the rheology of the flocculated MFT in addition to the flow and friction factors.

Flocculation conditioning occurs in-line to cause formation and rearrangement of flocs and increases the yield shear stress of the MFT. Referring to FIGS. 5 and 6, once the MFT has gone through the mixing zone 12, it passes directly to the flocculation conditioning zone 28 of the pipeline reactor. The flocculation conditioning zone 28 is generally a downstream pipe 26 with a specific internal diameter that provides wall shear to the MFT. In one aspect of the process, the flocculation conditioning increases the yield shear stress to an upper limit. The upper limit may be a single maximum as shown in FIG. 2 or an undulating plateau with multiple local maximums over time as shown in FIG. 3. The shape of the curve may be considered a primary function of the flocculent solution with secondary functions due to dispersion and energy input to the pipeline, such as via baffles and the like.

Water release conditioning preferably occurs in-line after the flocculation conditioning. Referring to FIGS. 2 and 3, after reaching the yield shear upper limit, additional energy input causes the yield stress to decrease which is accompanied by a release of water from the flocculated MFT matrix. Preferably, the water release conditioning occurs in-line in a continuous manner following the flocculation conditioning and before deposition. In this case, the water release may commence in-line resulting in a stream of water being expelled from the outlet of the pipe along with depositing flocculated MFT. The release water will quickly flow away from the MFT deposit, especially in a sloped deposition cell, while the MFT deposit has sufficient strength to gradually advance and then stand in the deposition cell. Here, it is preferred to have no high-shear units such as pumps in the downstream pipe. The hydraulic pressure at the MFT pipeline reactor inlet is preferably established so that no additional pumping which may over-shear the flocs would be required to overcome both static and differential line head losses prior to deposition. In some aspects, the deposited MFT is not disturbed with further shearing after deposition, but rather is left to dry after in place. Alternatively, instead of being performed in-line, the water release conditioning may occur in a controlled shearing apparatus (not shown) comprising baffles, an agitator, a mixer, or a rotary separator, or a combination thereof. The water release conditioning may also occur after the flocculated MFT is deposited, for instance by a mechanical mechanism in an ordered fashion. In such a case, the flocculated MFT would be deposited as a gel-like mass at a shear yield strength allowing it to stand but tending not to promote water release until additional energy input is applied. By conditioning the flocculated MFT back down from a yield stress upper threshold, the process avoids the formation of a gel-like water-retaining deposit, reliably enabling water release and accelerated drying of the MFT.

Care should also be taken not to expel the MFT from a height that would accelerate it to over shear due to the impact on the deposition cell or the previously deposited MFT.

Figure 16:
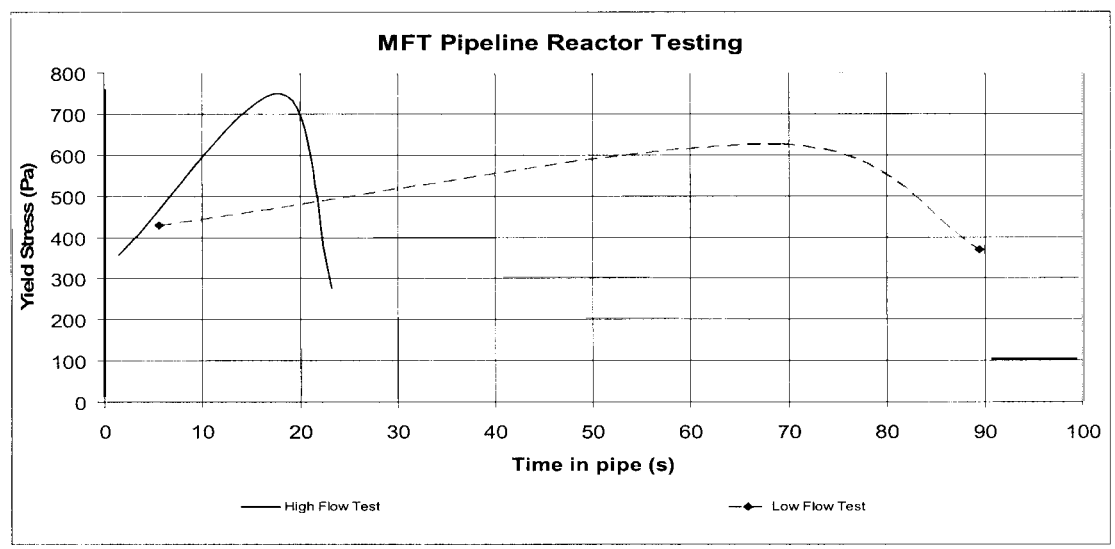
FIG. 16 is a graph of yield shear stress versus time in a pipe for different pipe flow rates for mature fine tailings treated with flocculent solution.

The flocculation conditioning and the water release conditioning may be controlled in-line by varying the flow rate of the MFT. Preferably, the flow rate may be as high as possible to increase the yield stress evolution rate of the flocculating MFT, while avoiding over-shear based on the hydraulic shear of the pipeline to the deposition area. Tests were conducted in a pipeline reactor to determine conditioning response. FIG. 16 identifies the response to varying the pipeline flow rate. A 34 wt % solids MFT was pumped through a 2 inch diameter pipe at a flow rate of about 26 LPM for the low flow test and about 100 LPM for the high flow test. A 0.45% flocculent solution was injected at about 2.6 LPM for the low flow test and at about 10 LPM for the high flow test. At high flows, the maximum yield shear stress of the flocculated MFT occurs earlier than at low flows. This observed response indicates that the total energy input is an important parameter with input energy being hydraulic losses due the fluid interacting with the pipe wall in this case.

Referring to FIGS. 5 and 6, the conditioning zone 28 may include baffles, orifice plates, inline static mixers or reduced pipe diameter (not shown) particularly in situations where layout may constrain the length of the pipeline reactor, subject to limiting the energy input so the flocculated MFT is not over sheared. If the flocculated MFT is over sheared, the flocs additionally break down and the mineral solids revert back to the original colloidal MFT fluid which will not dewater.

When the yield stress of the flocculated MFT at release is lower than 200 Pa, for some embodiments of the flocculation technique, the strength of the flocculated MFT may be inadequate for dewatering or reclamation of the deposited MFT. Thus, the yield shear stress of the flocculated MFT should be kept above this threshold. It should be understood, however, that other flocculation reagents may enable a flocculated MFT to dewater and be reclaimed at a lower yield stress. Thus, although FIGS. 2 and 3 show that a yield stress below 200 Pa is in the over-shearing zone, these representative figures do not limit the process to this specific value. When an embodiment of the process used 20%-30% charge anionic polyacrylamide high molecular weight polymers, the lower threshold of the yield shear stress window was about 200 Pa, and the flocculated MFT was deposited preferably in the range of about 300 Pa and 500 Pa, depending on the mixing and MFT solids content. It should also be noted that the yield shear stress has been observed to reach upper limits of about 400-800 Pa in the pipeline reactor. It should also be noted the yield shear stress of the MFT after the initial water is released when the MFT is deposited has been observed to exceed 1000 Pa.

In general, the process stage responses for a given flocculation reagent and MFT are influenced by flocculent type, flocculent solution hydraulic properties, MFT properties including concentration, particle size distribution, mineralogy and rheology, dosing levels and energy input.

The flocculation technique provides the advantageous ability to predict and optimize the performance of a given flocculent reagent and solution for deposition and dewatering MFT. The mixing zone ensures the efficient use of the flocculation reagent and the pipeline conditions of length, flow rate and baffles if required provide the shear necessary to maximize water release and avoid over-shearing when the MFT is discharged from the pipeline reactor.

After the in-line water release conditioning, the flocculated MFT may be deposited. The conditioned MFT is suitable for direct deposition into one or more deposition cells as per the method of the present invention, where water is released from the solids, drained by gravity and eventually further removed by evaporation to the air and optionally permeation into the deposition cell barrier. The deposition cells may be made of materials to facilitate draining and permeation. The MFT deposit may be farmed as per the procedures described herein, so that the deposit dries so as to reach a stable concentration of the MFT solids for reclamation purposes. Rather than direct deposition from the pipeline reactor into the cells, solid-liquid separation equipment may be used prior to deposition, provided the shear imposed does not over-shear the flocculated MFT. The MFT pipeline reactor may be used to treat MFT or other tailings or colloidal fluids having non-Newtonian fluid behaviour for deposition and farming. The application of cell design, plowing and disc harrowing may be performed on other treated tailings streams for dewatering processes including on pastes produced from thickeners, cyclones, and centrifuges, polymer-treated thin fine tails or scavenger bank tailings streams, and the like.

The raw oil sand fine tailings may be MFT continuously provided from a pond or thin fine tailings which are provided from ongoing extraction operations and bypass a pond. In a preferred aspect of the method, it is MFT that is dredged or pumped from a barge from a tailings pond such that the MFT has a solids content over 20 wt %, preferably within 30-40 wt %, and has a fines content of at least 75 wt % on a solids basis, preferably from 75-95 wt % on a solids basis. Such MFT is preferably undiluted, such that no water is added either alone or as a carrier for sand. Such solids and fines contents cooperate with the MFT flocculation process and further with the MFT deposition and farming methods to enable fines capture in the flocs in addition to advantageous pre- and post-deposition dewatering and eventual drying of the deposit. Such high fines contents further enable the improved flocculation of the MFT and deposition dewatering. Alternatively, when the fine tailings are thin fine tailings, the fines content is preferably at least 50 wt % on a solids basis, which also allows advantageous dewatering and drying.

EXAMPLES

Example 1

Figure 23:
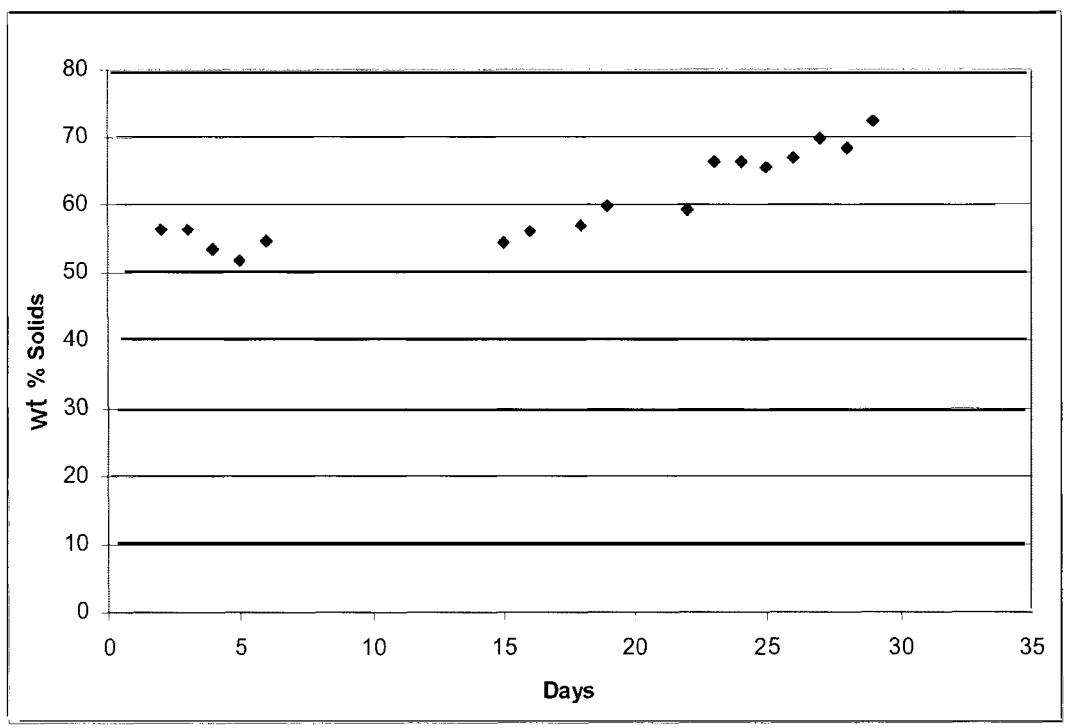
FIG. 23 is a graph of percent solids versus time of a drying deposit according to an embodiment of the method.

FIG. 23 provides details on a set of operational conditions and drying rates obtained in exemplary MFT deposition. The conditions are summarised below:

| Cell dimensions | m × m | 165 × 43 |
|---|---|---|
| Cell Area | m2 | 6110 |
| Cell slope | % | 2 |
| MFT flow rate | gpm | 2000 |
| Total MFT deposited | m3 | 2800 |
| Polymer flocculent dosage | ppm | 870 |
| Farming | | No plowing or harrowing |

Example 2

Figure 24:
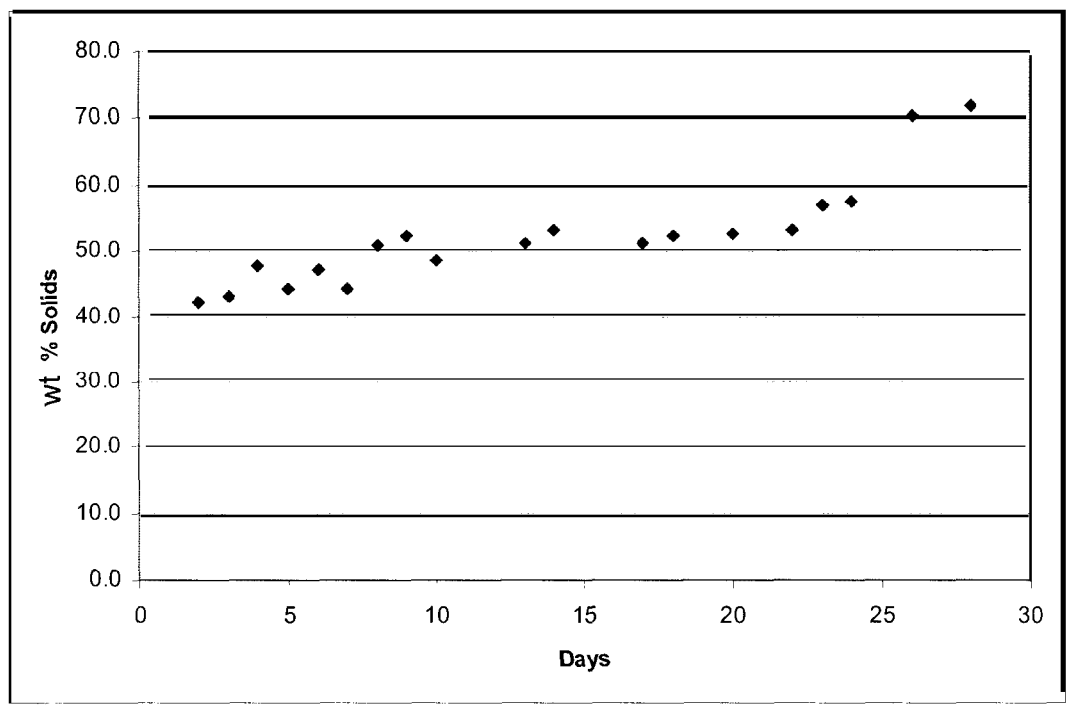
FIG. 24 is a graph of percent solids versus time of a drying deposit according to another embodiment of the method.

FIG. 24 provides details on another set of operational conditions and the drying rates obtained in exemplary MFT deposition. The conditions are summarised below:

| Cell dimensions | m × m | 180 × 36 |
|---|---|---|
| Cell Area | m2 | 6632 |
| Cell slope | % | 2 |
| MFT flow rate | gpm | 2000 |
| Total MFT deposited | m3 | 2000 |
| Polymer flocculent dosage | ppm | 1040 |
| Farming | | Plowing on $9^{th}$ day and harrowing on $15^{th}$ day |

Example 3

For the deposition and farming methodology, embodiments of the method of the present invention were contrasted to other possible techniques.

The method has the ability to treat variable shear strength material in a fixed cell slope design that minimizes the channelling effects for the material produced from the MFT drying process. The co-implementation of post-deposition farming techniques, in conjunction with the cell slope design, further improves the drying and further addresses the challenges relating to thick deposits, and surface water drainage.

Embodiments of the method of the present invention allow improvements in materials handling with respect to other possible technologies, such as bag filters, filter presses, and track packing operations.

Example 4

Trials showed that if the deposit is left unplowed, water drains from the head (thickest) to the toe (thinnest) region, flowing the hydraulic gradient dictated by the cell slope design. This was confirmed by strength and solids content observations. Fast drying of shallow lift sections is often aided by the effect of drainage path short circuit created during plowing.

Example 5

Figure 15:
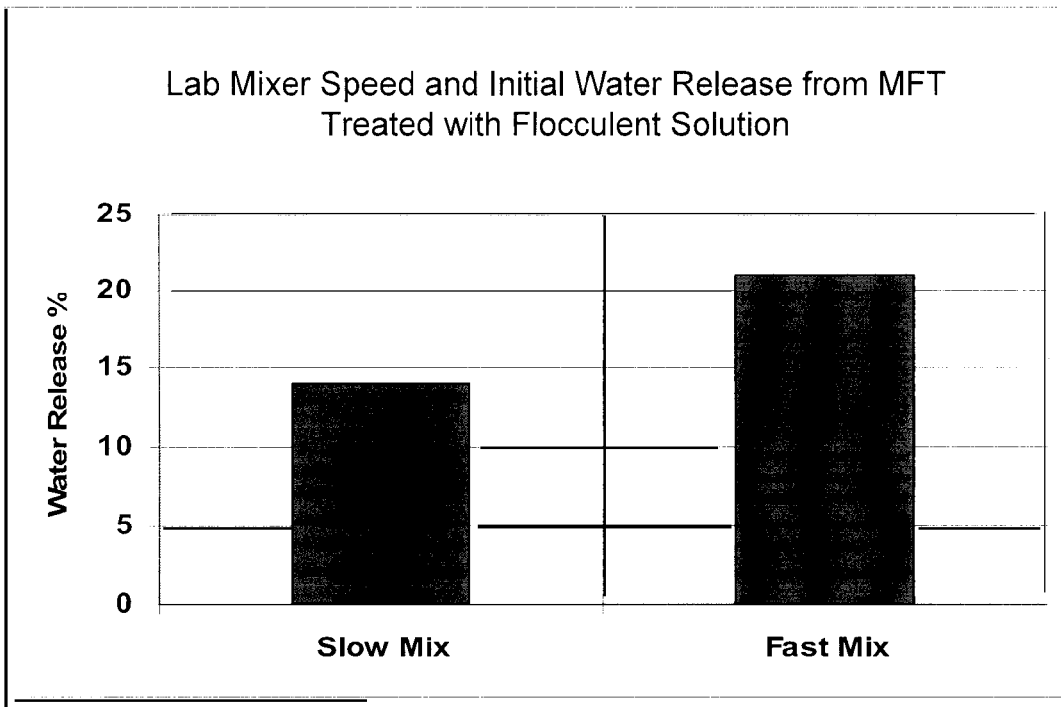
FIG. 15 is a bar graph of water release percentage versus mixing speeds for mature fine tailings treated with flocculent solution.

As mentioned in the above description, lab scale stirred tank tests were conducted to assess mixing of a flocculent solution into MFT. The lab mixer was run at initial speeds of 100 RPM or 230 RPM. The dosage of 30% charge anionic polyacrylamide-polyacrylate shear resistant co-polymer was about 1000 g per dry ton. FIGS. 14 and 15 show that the fast initial mixing shortens the yield stress evolution to enable dewatering and also increases the water release from the MFT.

Example 6

As mentioned in the above description, lab scale stirred tank tests were conducted to assess mixing of different dosages of flocculent solution into MFT. The lab mixer was run at speeds of 100 RPM or 230 RPM for flocculent solutions containing different doses of dissolved flocculation reagent. The dosages of flocculent ranging from 800 to 1200 g per dry tonne of MFT indicated adequate mixing and flocculation for dewatering. The flocculation reagent here was a 30% charge anionic polyacrylamide-polyacrylate shear resistant co-polymer with a molecular weight over 10,000,000. A dosage range of 1000 g per dry tonne ±20% was appropriate for various 30% charge polyacrylamides for MFT with clay content of 50 to 75%.

Example 7

As mentioned in the above description, continuous flow pipeline reactor tests were conducted. Results are shown in FIG. 16 comparing high and low flow rates. A 34 wt % solids MFT was pumped through a 2 inch diameter pipe at a flow rate of 26 LPM for the low flow test and 100 LPM for the high flow test. A 0.45% organic polymer flocculent solution was injected at 2.6 LPM for the low flow test and at 10 LPM for the high flow test. The distance from injection to deposition was 753 inches or 376.5 pipe diameters. The 2 inch long orifice mixer had an orifice to downstream pipe diameter ratio d/D=0.32 with six 0.052 inch diameter injectors located on a 1.032 inch diameter pitch circle. For the high flow test the six injector diameters were increased to 0.100 inch.

Example 8

As mentioned in the above description, computational fluid dynamic (CFD) modelling was conducted. The CFD modelling considered the flocculent solution as a Power-law-fluid and the MFT as a Bingham-fluid in the mixing zone and confirmed both the adequate mixing of the injection device of FIGS. 4 and 5 and the inadequate mixing of the conventional side branch tube as discussed in the Background section under the same conditions. The MFT flow rate in a 2 inch diameter pipe was 30 LPM and polymer solution was injected at 3 LPM. The 2 inch long orifice mixer had an orifice to downstream pipe diameter ratio d/D=0.32 with six 0.052 inch diameter injectors located on a 1.032 inch diameter pitch circle. The MFT had a density of 1250 kg/m$^3$ and a yield stress of 2 Pa while the polymer solution had a density of 1000 kg/m$^3$, with a power-law index n=0.267 and a consistency index of 2750 kg s$^{n-2}$/m.

Furthermore, the visualization shown in FIGS. 7-9 is only possible by CFD modelling due to the opaqueness of actual MFT. For MFT, the CFD model incorporates non-Newtonian fluid behaviours into the hydraulic analysis to develop a robust design for a variety of possible combinations and permutations between various MFT properties and flocculation reagent solutions.

Example 9

As described above, the flocculation technique relies on its process steps rather than in the specific flocculation reagent selected. A person skilled in the art may select a variety of flocculation reagents that enable in-line dispersion, flocculation, water release and non-flowing deposition. One selection guideline method includes taking an MFT sample representative of the commercial application and using a fast-slow mixer test to observe the water release capability of the flocculent. In the fast-slow mixer test, the flocculent is injected into the mixer running at a fast mixing rate and after a delay of 7 seconds the mixer is switched to slow mixing. Water release may then be assessed. For instance, test have been run at 230 RPM (corresponding to a shear rate of 131.5 s$^{-1}$) for fast mixing and 100 RPM (corresponding to a shear rate of 37.5 s$^{-1}$) for slow mixing. A fast-slow mixer test was conducted on 10%, 20%, 30% and 40% charge anionic polyacrylamide flocculants and the 30% charge anionic polyacrylamides enabled superior water release. The use of such 30% charge anionic polyacrylamides in the pipeline reactor and CFD modeling validated this approach. In addition, the fast-slow mixer test was conducted on high and low molecular weight linear anionic polyacrylamide flocculents and the high molecular weight polyacrylamides enabled superior water release. The fast-slow mixer test may be combined with the CFD model to test the mixing of the flocculent solution at the density of the desired formulation. Such cross-validation of flocculation reagents and solutions helps improve the flocculation process and deposition/farming method operating conditions and validate preferred flocculation reagents and solutions.

Example 10

Figure 17:
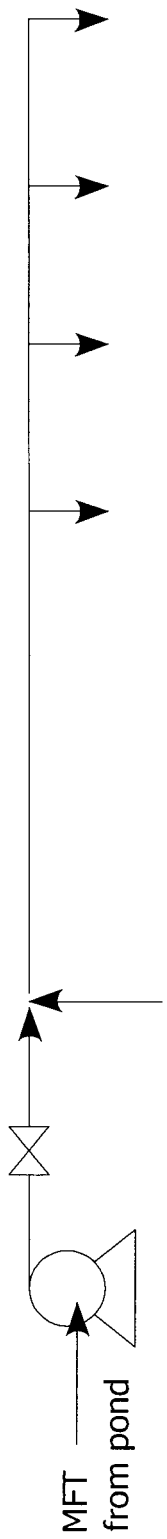
FIG. 17 is a schematic representation of treating mature fine tailings with a flocculent solution.
Figure 18:
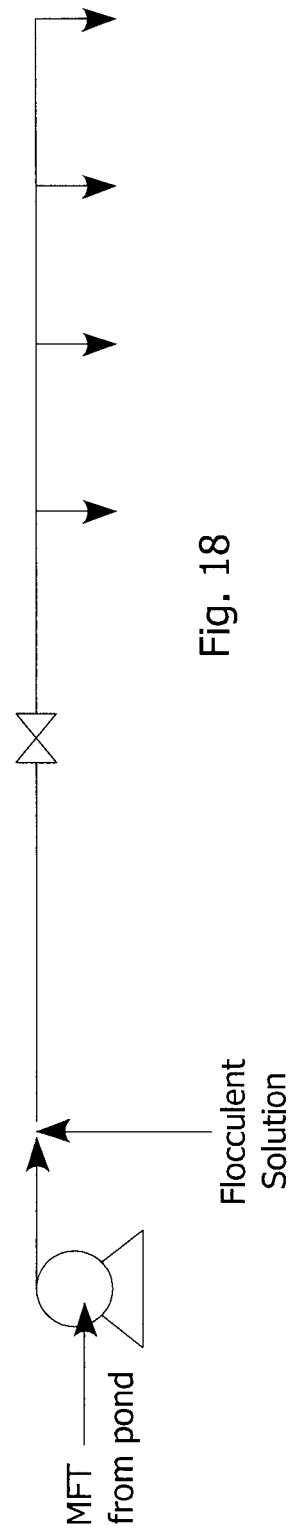
FIG. 18 is another schematic representation of treating mature fine tailings with a flocculent solution.
Figure 19:
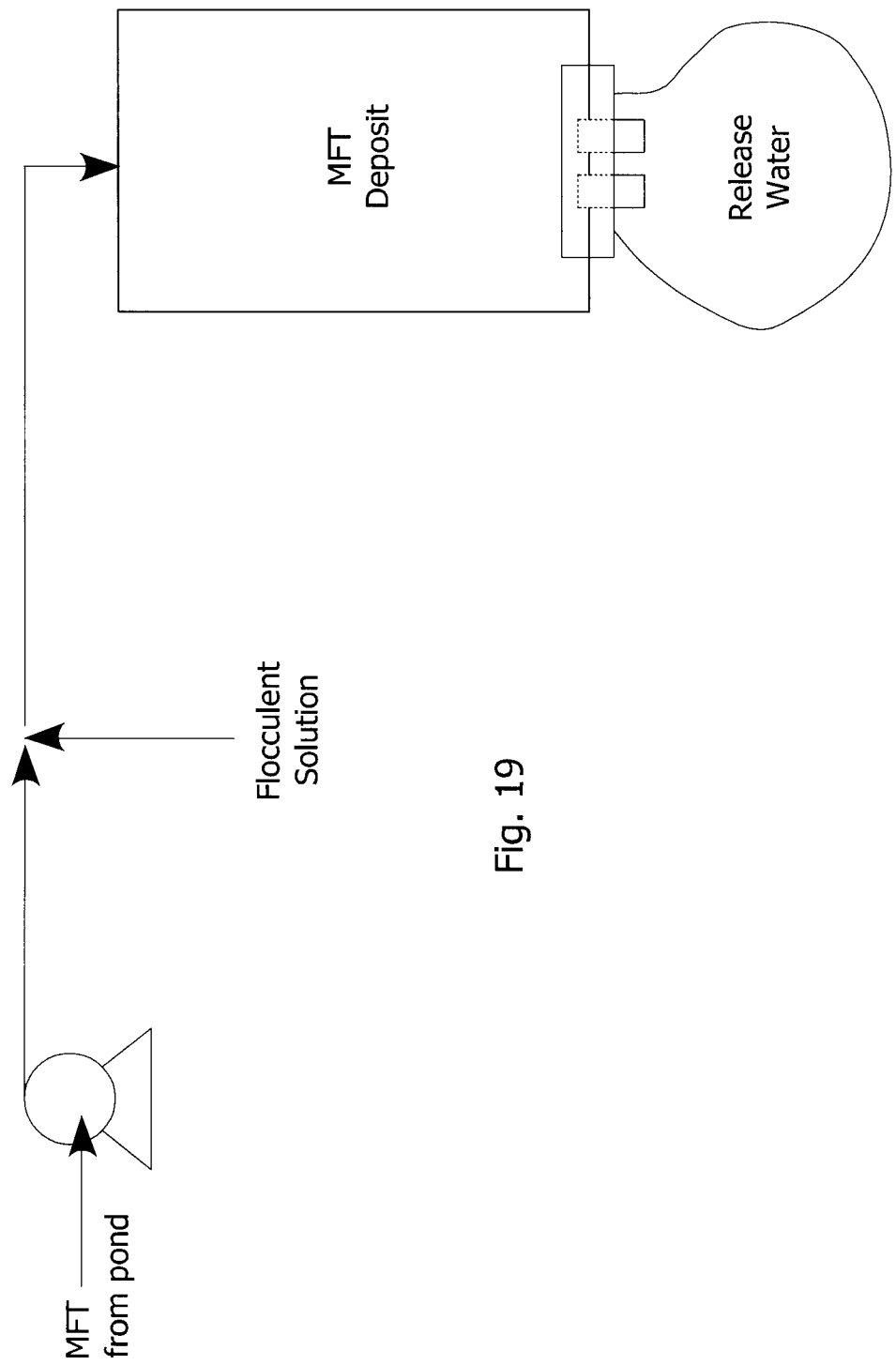
FIG. 19 is another schematic representation of treating mature fine tailings with a flocculent solution.

Trials were performed and showed that a flocculation reagent could be injected into MFT in-line followed by pipeline conditioning, deposition and drying. FIGS. 17-19 schematically illustrate different experimental setups that were used. For FIGS. 17 and 18, the flocculated MFT was deposited onto beaches and for FIG. 19 into a deposition cell.

The MFT was about 36 wt % solids and was pumped from a pond at flow rates between 300 and 720 gal/min. The flocculent solution was injected in-line at different locations. One of the flocculent reagents used was a 30% charge anionic polyacrylamide-sodium polyacrylate co-polymer with a molecular weight over 10,000,000. The flocculated MFT ws conditioned along a pipeline and then expelled out of spigots arranged in series.

Figure 20:
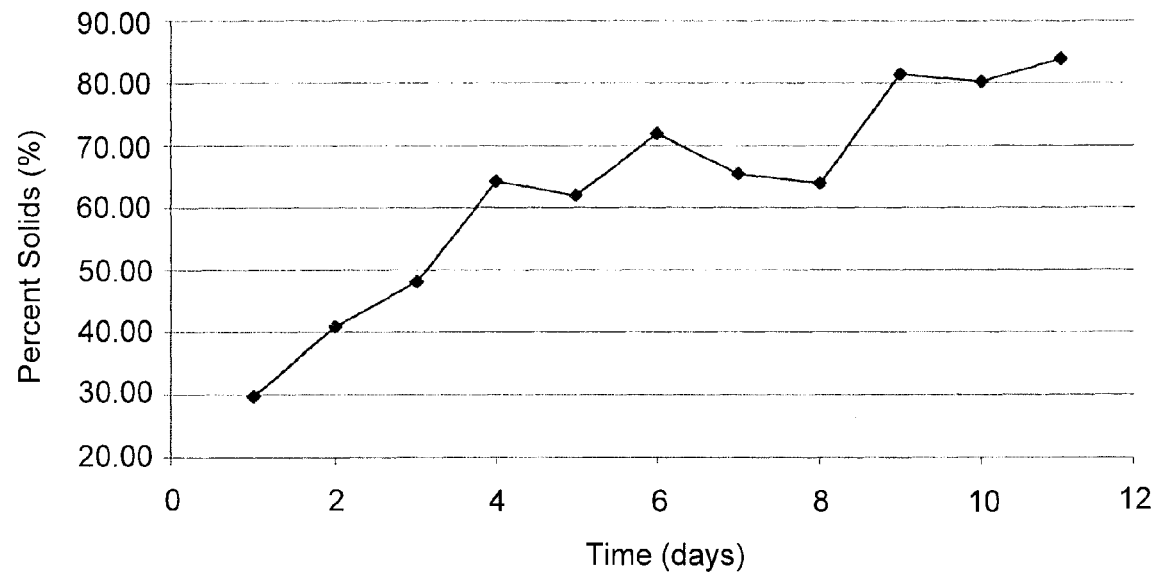
FIGS. 20 and 21 are graphs of percent solids as a function of time for deposited MFT showing drying times according to trial experimentation.
Figure 21:
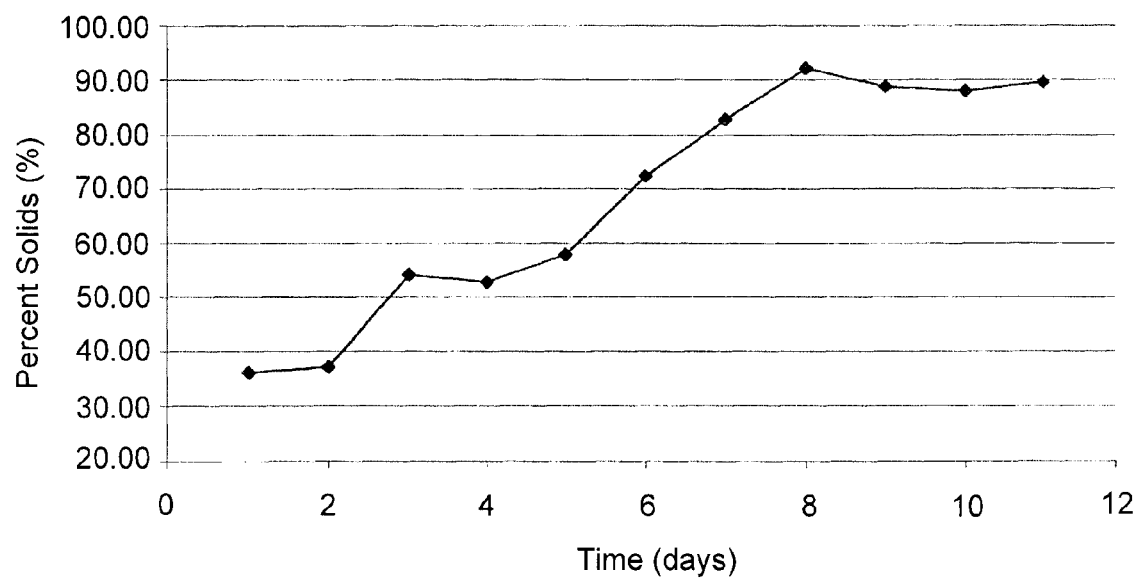

In order to monitor the progress of the drying, samples were taken and analyzed for percent solids. The drying times to achieve 75 wt % solids ranged from 5 to 7.5 days depending on the sample location. Deposition areas having a slope showed faster drying. FIGS. 20 and 21 show some results at two different sample points of the drying times of deposited MFT.

Dosages between 0.6 Kg to 1.1 Kg per dry tonne of MFT provided preferred drainage results, and much cleaner effluent water than those outside this range. Trials revealed that incorrect dosage may reduce dewatering for a number of reasons. If the dosage is too low, some of the MFT goes unflocculated and overall there is a lack of dewatering performance. Overdosing flocculent applications may also lead to reduced dewatering due to allowing water to become bound up in semi-gelled masses with the solids making it more difficult to provide conditioning sufficient to allow water release with the given pipeline dimensions and hydraulic conditions. Both of these situations were observed and dosage adjustments were made to compensate. In addition, water quality depends on dosage control. Overdosing or inadequate mixing (resulting in localised overdosing) resulted in poor water quality with at times over 1 wt % solids. Increased dosing control, the preferred dosage range and rapid initial mixing helped resolve water quality issues and improve dewatering and drying of the deposited MFT. Other observations noted that the deposited MFT dewatered and dried despite significant precipitation, thus resisting re-hydration from precipitation.

Reclamation of the MFT deposits was further observed as vegetation from seeds tossed on the deposition area was later noted to be growing well.

Example 11

Figure 22:
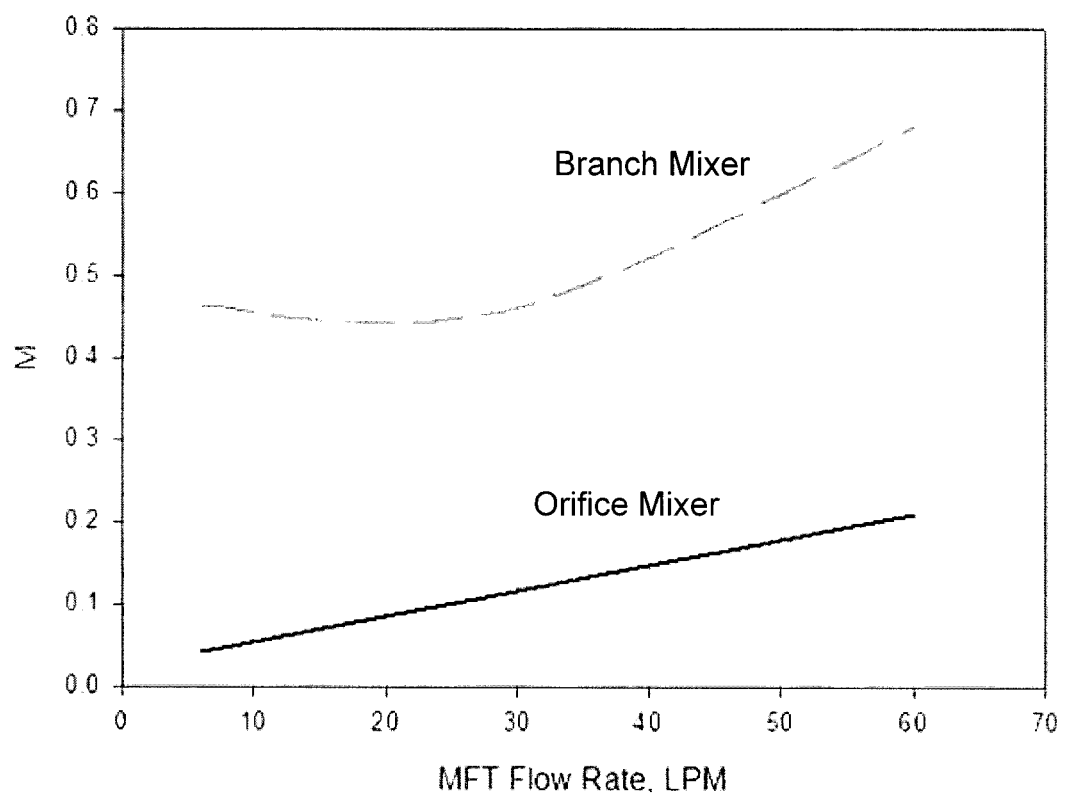
FIG. 22 is a graph of second moment M versus MFT flow rate for different mixers.

One of the challenges to successful treating of MFT is the process variations encountered in operations. It may be desired to use a side injection nozzle to for mixing liquids into MFT. Using the mixing algorithm developed for the MFT pipeline reactor model, FIG. 22 compares a typical side injection nozzle to the orifice nozzle of FIG. 5 on a 2 inch pipeline for a range of MFT flows based on:

The MFT is 30 wt % solids and modeled as a Herschel-Bulkley fluid with a yield stress of 2 Pa and high shear rate viscosity of 10 mPa s. Density was 1250 kg/m$^3$.

The flocculent solution was modeled as Power Law fluid with n=0.267 and consistency index (k) of 2750 kg s$^{n-2}$/m. Density was 1000 kg/m$^3$ and the flow rate was 1/10 the MFT volume flow rate The orifice mixer had a 0.32 orifice ratio.

The flow area for injecting the polymer solution was the same for both mixers.

FIG. 22 illustrates that the orifice mixer of FIG. 5 provides significantly preferred mixing than the conventional side injection nozzle over the range of MFT flows.

The invention claimed is:

1. A method for drying fine tailings, comprising:
providing a deposition cell comprising:
a head region;
a toe region spaced away from the head region; and
a sloped bottom surface extending from the head region to the toe region such that the toe region is at a lower elevation than the head region;
depositing flocculated fine tailings at the head region of the deposition cell, to form a deposit that undergoes buildup and moves down the sloped bottom surface, the deposit forming a built-up area and a lower area; and
plowing the deposit while wet to spread the modified fine tailings from the built-up area toward the lower area, to ensure water release conditioning while avoiding over-shearing and maintaining sufficient shear strength of the flocculated fine tailings to allow standing.

2. The method of claim 1, wherein the plowing is performed by providing a plow device comprising a cross-member extending across the deposition cell at the built-up area and displacement means for displacing the cross-member toward the lower area, thereby engaging the flocculated fine tailings with the cross-member to relocate the same.

3. The method of claim 2, wherein the cross-member comprises a concave surface facing the direction of displacement.

4. The method of claim 2, wherein the plow device is operated to provide a single plowing sweep from the built-up area to the lower area.

5. The method of claim 1, further comprising, after the plowing, allowing the deposit to partially dry to form a dried upper crust and then harrowing the deposit to break up the dried upper crust.

6. The method of claim 1, further comprising:
introducing a flocculation reagent into the fine tailings, to cause dispersion of the flocculation reagent and commence flocculation of the fine tailings;
prior to deposition, subjecting the fine tailings to flocculation conditioning to cause formation and rearrangement of flocs and increasing the yield shear stress, thereby producing the flocculated fine tailings; and
subjecting the flocculated fine tailings to water release conditioning partially in-line to stimulate release of water while avoiding over-shearing of the flocs.

7. The method of claim 6, wherein:
the flocculation reagent is introduced into the fine tailings at an in-line mixer;
a plurality of the deposition cells are provided, each being in fluid connection with the mixer via a corresponding pipeline;
for at least one of the deposition cells, the corresponding pipeline provides sufficient water release conditioning in-line prior to depositing the flocculated fine tailings, to stimulate release of water while avoiding over-shearing of the flocs; and
for at least another of the deposition cells, the corresponding other pipeline provides insufficient water release conditioning in-line prior to depositing, and thus the water release conditioning further comprises the plowing to both spread and mechanically shear the deposit within said deposition cell.

8. The method of claim 7, wherein the plowing is selectively performed in each of the deposition cells to provide sufficient water release conditioning to each corresponding deposit.

9. The method of claim 1, wherein the fine tailings comprise mature fine tailings (MFT).

10. The method of claim 1, wherein the fine tailings comprises oil sands fine tailings.

11. The method of claim 10, wherein the fine tailings comprises oil sands mature fine tailings (MFT).

12. The method of claim 1, wherein the fine tailings comprises a colloidal fluid having non-Newtonian fluid behavior.

* * * * *